(12) United States Patent
Denton

(10) Patent No.: US 12,371,916 B2
(45) Date of Patent: Jul. 29, 2025

(54) ELEVATION ADJUSTABLE PORTABLE TOILET TRAILER

(71) Applicant: Bradley Denton, Minooka, IL (US)

(72) Inventor: Bradley Denton, Minooka, IL (US)

( * ) Notice: Subject to any disclaimer, the term of this patent is extended or adjusted under 35 U.S.C. 154(b) by 90 days.

(21) Appl. No.: 18/401,277

(22) Filed: Dec. 29, 2023

(65) Prior Publication Data

US 2025/0215714 A1 Jul. 3, 2025

(51) Int. Cl.
*B60D 1/36* (2006.01)
*E04H 1/12* (2006.01)

(52) U.S. Cl.
CPC ............. *E04H 1/1216* (2013.01); *B60D 1/36* (2013.01)

(58) Field of Classification Search
CPC . B60P 7/08; A47K 11/02; B60R 15/04; E04H 1/1216; B60D 1/36
See application file for complete search history.

(56) References Cited

U.S. PATENT DOCUMENTS

| 5,183,293 A * | 2/1993 | Julian .................. E04H 1/1216 |
| | | 414/419 |
| 2012/0167297 A1* | 7/2012 | Poust .................... E04H 1/1205 |
| | | 4/321 |
| 2021/0253043 A1* | 8/2021 | Meegan .................... B60P 7/08 |

* cited by examiner

*Primary Examiner* — Janie M Loeppke
(74) *Attorney, Agent, or Firm* — Donald G. Flaynik

(57) ABSTRACT

An elevation adjustable portable toilet trailer includes a receiving frame for detachably securing a portable toilet to an elevation adjustable portable toilet trailer; a tow bar secured to a front corner of the receiving frame; two wheels rails having first ends detachably secured to a plate secured to a cooperating back corner of said receiving frame, and second ends pivotally secured to corresponding front and back corners of the receiving frame; a trailer wheel secured to each wheel rail; front channels secured to respective front corners of the receiving frame, each front channel receiving a cooperating base portion of the portable toilet; a locking member detachably secured to the receiving frame, the locking member ultimately engaging a top portion of the base portion of the portable toilet, and detachably securing the portable toilet to the receiving frame; and a trailer jack secured to a back corner of said receiving frame, the trailer jack ultimately elevating and lowering the receiving frame to selected elevations.

20 Claims, 30 Drawing Sheets

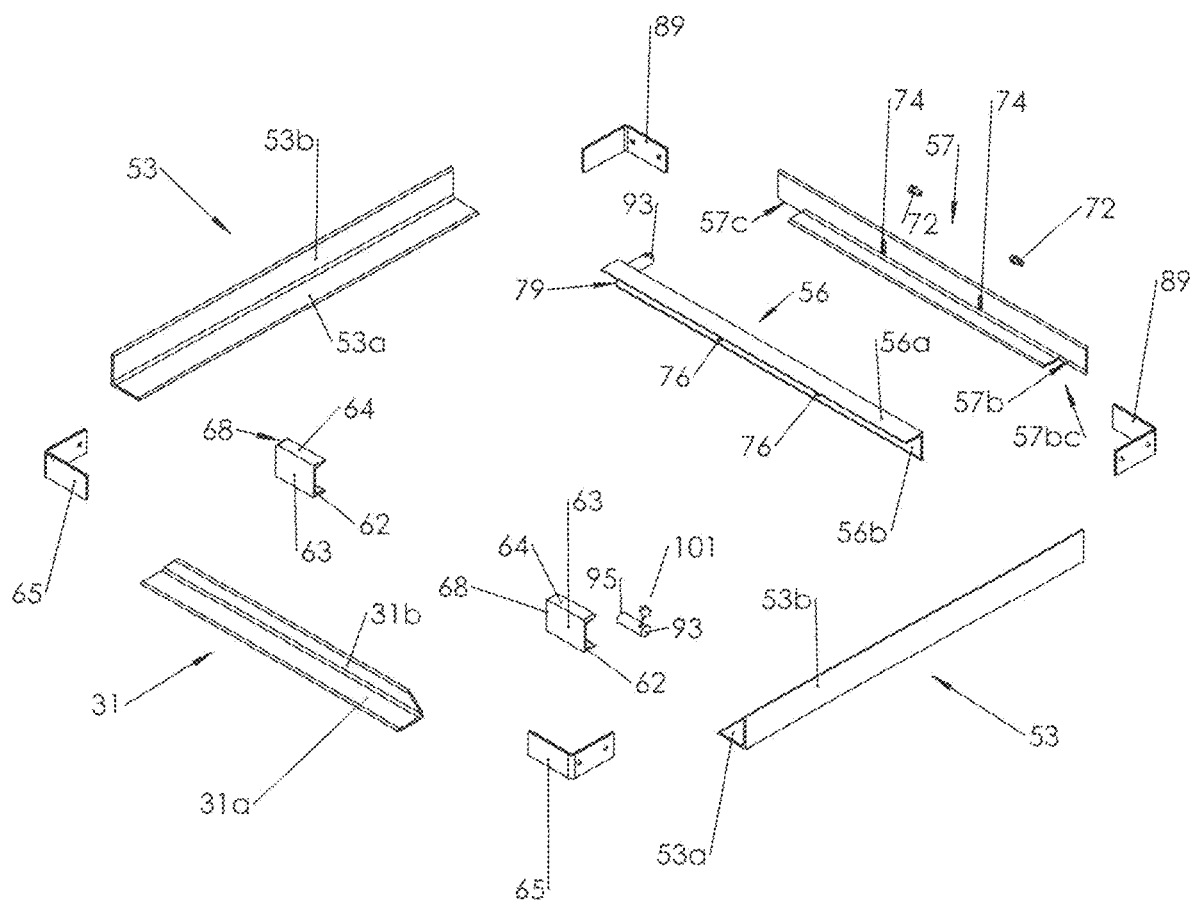
Figure 1A1

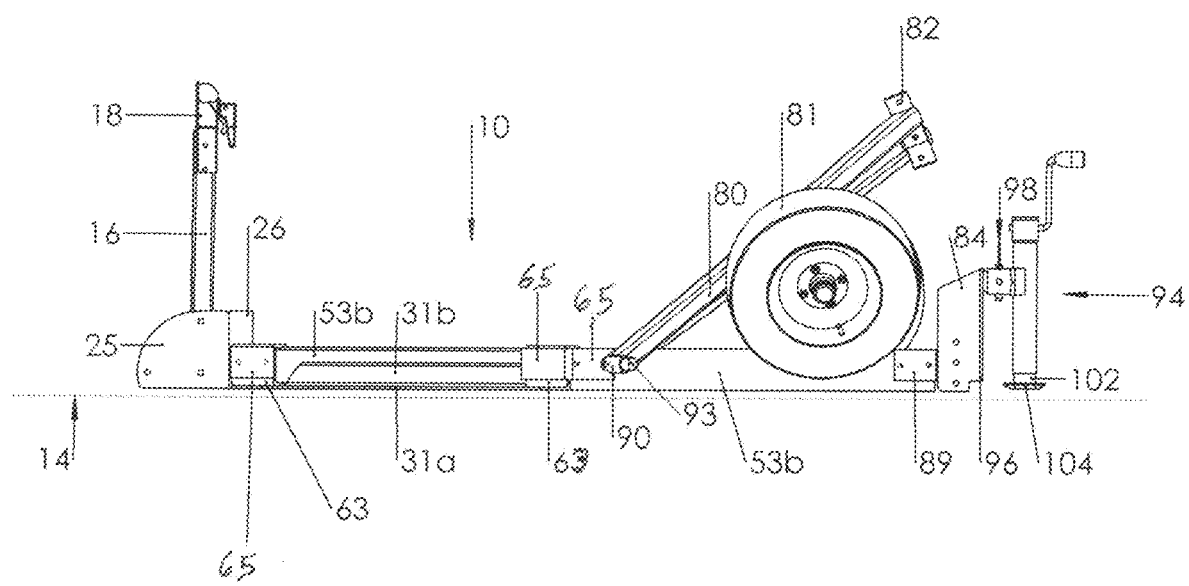
Figure 2A1

ELEVATION ADJUSTABLE PORTABLE TOILET TRAILER

BACKGROUND OF THE INVENTION

Field of the Invention

The present invention relates to a trailer that includes a clamp member or coupler for detachably securing the trailer to a hitch secured to a rearend of a towing vehicle, and more particularly, to an elevation adjustable portable toilet trailer that detachably receives a portable toilet, whereby, the trailer-portable toilet assembly enables a towing vehicle to transport a portable toilet to a user site; whereupon, the portable toilet trailer with the attached portable toilet is detached from the towing vehicle, and the portable toilet trailer, with the attached portable toilet, is lowered and ultimately disposed upon a substantially horizontal destination.

After the portable toilet trailer is disposed upon a selected surface, the portable toilet remains secured to the portable toilet trailer, whereby, a user of the portable toilet is capable of safely stepping up (approximately 7 inches) from the ground surface to the floor surface of a solid 7-inch base or skid portion of the portable toilet. The 7-inch ground to floor elevation is consistent with safety requirements for the user of the portable toilet. After the portable toilet is no longer required, the portable toilet trailer and the attached portable toilet is elevated to a position that promotes securing a trailer clamp member to a towing vehicle hitch, thereby enabling the portable toilet trailer and attached portable toilet to be towed to a new destination.

Background of the Prior Art

Prior art portable toilet trailers enable a portable toilet to be hauled to a user site, whereupon, the portable toilet remains attached to the trailer and elevated above a receiving surface, whereby a step is required to enable a user to enter and exit the elevated portable toilet having a floor surface disposed at least 7-inches above the axel(s) of the trailer. Alternatively, a portable toilet secured to a trailer is hauled to a selected site; whereupon, the portable toilet is lifted or slid from the trailer via a lowered gate portion of the trailer, or the portable toilet is hauled to a selected site via a truck with a hydraulic gate that lowers the portable toilet to ground level. The portable toilet is then lifted or slid from the lowered hydraulic gate upon the selected site. The lifting or sliding of the portable toilet from the gate portions is achieved manually or by a forklift type device.

The problem with the prior art portable toilet-trailer assemblies that include a portable toilet integrally joined to the trailer, is that a user must step up to a portable toilet floor elevation that requires one or more steps for the user to access the toilet. The required extra step(s) results from a base (7-inches thick) of the portable toilet being secured upon the frame of the trailer, and the frame of the trailer being secured to and above the axels of the trailer wheels, thereby elevating the floor surface of the portable toilet approximately 18 inches above a ground surface.

Alternatively, if the portable toilet is transported to a destination via a truck carrying multiple portable toilets, one or more portable toilets are ultimately disposed upon a selected ground surface via a horizontally disposed hydraulic truck gate portion of the truck lowering one or more portable toilets upon ground level; whereupon, one or more portable toilets are removed from the lowered gate and disposed upon selected surface areas. The problem with using the hydraulic gate is the added time for an individual to lower the gate, manually move the toilet upon the gate, elevate the gate to the bed of the truck, manually move the toilet upon the bed of the truck, and lock the gate in a vertical position.

A portable toilet trailer ("trailer") is required with features that overcome the problems of the prior art. The features include detachably securing the trailer to a towing vehicle; detachably securing a portable toilet upon a receiving frame of the trailer; separating the trailer from the towing vehicle with the portable toilet detachably secured to the trailer receiving frame; lowering the trailer upon a ground surface with the detachably secured portable toilet remaining secured to the receiving frame; and elevating the trailer with the portable toilet secured to the receiving frame to enable the trailer to be detachably secured to a towing vehicle hitch; whereby the portable toilet trailer with the portable toilet detachably secured to the receiving frame of the trailer is transported to another destination.

SUMMARY OF THE INVENTION

It is an object of the present invention to overcome many of the disadvantages associated with prior art trailers for transporting portable toilets. A principal object of the present invention is to provide an elevation adjustable portable toilet trailer 10 that is detachably secured to a tow vehicle hitch with a portable toilet 12 being detachably secured to a toilet receiving frame 24 of the trailer, then towing the trailer-portable toilet assembly to a destination; whereupon, the trailer 10 is detached from the tow vehicle hitch and lowered, with the portable toilet 14 remaining secured to the trailer, until a coupler 18 of the trailer 10 is disposed upon a ground surface. A feature of the trailer 10 is the repositioning of trailer wheels relative to the toilet receiving frame 24 of the trailer 10. An advantage of the trailer 10 is that once the trailer wheels 81 are repositioned, the trailer 10 is ultimately disposed upon a substantially horizontal surface, thereby eliminating steps to enable a user to step up to the elevation (about seven inches above ground surface) of the floor of the portable toilet 12. Another advantage of the trailer 10 is that a lifting gate for loading and unloading portable toilets 12 upon the bed of a truck is not required.

Another object of the present invention is to configure an elevation adjustable portable toilet trailer 10, whereby the portable toilet 12 is orientated to reduce air flow obstruction when towing the portable toilet 12 to a selected site. A feature of the trailer 10 is pivotally attaching a tow bar 16 to a front corner 22 of a substantially rhombus configured receiving frame 24 (when taking a top view of the trailer), whereby the tow bar 16 is axially aligned with a diagonal line 36 of the rhombus configured receiving frame 24. An advantage of the tow bar 16 connection to the trailer corner 22 is that air flow, generated via the tow vehicle pulling the trailer forward, engages a corner portion 40 of the portable toilet 12 formed from adjacent walls 42 and 44 of the portable toilet 12 forming a ninety-degree corner 40 of the portable toilet 12 lineally aligned with the diagonal line 36 of the receiving frame. Wind engaging the corner portion 40 instead of a planar surface of the portable toilet 12, results in reduced wind resistance when compared to a portable toilet 12 orientated whereby wind engages a planar surface of the portable toilet 12.

Another advantage of the tow bar 16 connection to the trailer corner 40 lineally aligned with a diagonal of the trailer is that the air flow remains substantially laminar, thereby maintaining an "angled" door 48 of the portable toilet 12 in a closed position when hinges 50 of the door 48 are closer to the tow bar 16 than a locking handle 52 for the door 48. Air flow engaging a forward positioned door 48 of a portable toilet disposed upon a trailer, whereby a tow bar 16 is perpendicularly and integrally joined to a midportion of a front portion of a trailer 10, results in a substantially turbulent air flow upon the surface of the door that can cause the door 48 to vibrate and damage the door handle 52 and/or cause the door 48 to open when a relatively strong wind engages a portable toilet 12 being towed at a relatively fast speed. Still another advantage of pivotally attaching a tow bar 16 to the front corner 22 of the substantially rhombus configured receiving frame 24 is that after towing the portable toilet 12 to a destination and lowering the trailer-portable toilet assembly upon a surface area, the tow bar 16 can be pivoted to a substantially vertical position, thereby preventing a user of the toilet from tripping upon the tow bar 16 disposed substantially horizontally upon a ground surface.

Still another object of the present invention is to provide an elevation adjustable portable toilet trailer 10 having a portable toilet receiving frame 24 that snugly and securely receives a portable toilet 12; whereupon, a locking bar 56 of the receiving frame 24 detachably secures the portable toilet 12 upon the receiving frame 24. A feature of the trailer 10 is that the receiving frame 24 is formed by one front angle bar 31, two side angle bars 53 and one back angle bar 57, dimensioned and configured to snugly receive and support a base portion 71 of the portable toilet 12. Another feature of the trailer 10 is that horizontal end portions of the two side angle bars 53 are disposed upon and secured to respective horizontal end portions of front and back angle bars 31 and 57. Another feature of the trailer 10 is that the side angle bars 53 are slightly longer than the length of side portions of the base or skid portion 71 of the portable toilet 12. Still another feature of trailer 10 is that four corner members each having a ninety-degree bend is integrally joined to respective angle bars 31, 53 and 57, thereby fortifying the receiving frame 24 when experiencing vibrations when hauling the portable toilet 12. Another feature of the trailer 10 is that two front receiving channels 63 are secured to respective front corner members 65 forming the receiving frame 24. The receiving channels 63 include top horizontal extension portions 64 that form a ninety-degree angle with vertical portions 68 of the receiving channels 63. The top horizontal extension portions 68 of the receiving channels 63 slidably and snugly receive corresponding top walls 70 of front toe members 67 of the base portion 71 of the toilet 12 as the base portion 71 is slid upon the receiving frame 24.

An advantage of the trailer 10 is that the side angle bars 53 enable a user to slide the base portion 71 of the portable toilet 12 upon the receiving frame 24 by elevating a back base portion 46 of the portable toilet over a vertical portion 31b of the front bar 31 of the receiving frame 24, then sliding side portions 59 of the base portion 71 of the toilet 12 upon the horizontal portions 53a of the side bar members 53 until a back base portion 46 of the toilet 12 engages a vertical portion 57b of the back angle bar 57 of the receiving frame 24. Another advantage of the trailer 10 is that after the vertical wall of the back base portion 46 of the toilet engages the vertical portion 57b of the back angle bar 57, a front base portion 43 of the portable toilet 12 can be snugly slid forward until the top walls 70 of the toe members 67 of the base portion 71 engage the upper inner wall 62 of the horizontal extension portions 64 of the receiving channels 63; whereupon, the base portion 71 is positioned to enable a vertical portion 56b of a locking angle bar 56 to be detachably secured to a vertical portion 57b of the back angle bar 57, and a horizontal portion 57a of the back angle bar 57 to engage a back top edge portion 55 of the base portion 71 of the portable toilet 12, thereby cooperating with the two top horizontal extension portions 64 of the receiving channels 63 to detachably secure the portable toilet 12 upon the receiving frame 24 of the trailer 10.

Yet another object of the present invention is to provide an elevation adjustable portable toilet trailer 10 having wheel rails 80 pivotally joined to the receiving frame 24. A feature of the wheel rails 80 is cooperating first ends 82 of each wheel rail 30 are detachably secured to an inner plate 84 of a corner support member 86 via respective fasteners 92 that engage cooperating first ends 82 of both wheel rails 80 and the inner plate 84 of the corner support member 86. A feature of the wheel rails 80 is a cooperating extension member 88 that is detachably secured to a trailer wheel 81. Another feature of the wheel rails 80 is that each rail 80 includes a pivoting second end opposite a corresponding detaching first end 82, whereby each wheel rail 80 is allowed to pivot the detaching first end 82 above the receiving frame 24 of the trailer 10 after each detaching first end 82 is separated from the inner plate 84 of the corner support member 86. An advantage of the wheel rails 80 is that after respective fasteners 92 are removed from detaching first ends 82 of each wheel rail 80 and the inner plate 84 of the corner support member 86, and after the detaching first ends 32 of the wheel rails 80 are pivoted above the receiving frame 24 of the trailer 10 via a user forcibly extending a base member 104 of a trailer jack 94 upon a ground surface 14, the trailer wheels 81 are angularly repositioned on the ground surface 14 and the receiving frame 24 of the elevation adjustable portable toilet trailer 10 is disposed upon the ground surface 14.

Anther object of the present invention is to provide a trailer jack 94 detachably and vertically secured to an outer plate 96 of a corner support member 86 via a cotter pin 98. A feature of the corner support member 86 is that the outer plate 96 forms a substantially "T" configuration with an inner plate 84, when taking a top view of the corner support member 86 of the trailer 10, thereby aligning a vertical axis of the trailer jack 94 with two vertically disposed edges 90 of the inner plate 84; the diagonal line 36 of the receiving frame 24; and axis of the tow bar 16, irrespective of the tow bar 16 being disposed in a horizontal or vertical position. An advantage of the trailer jack 94 is that the jack 94 can be extended after the tow bar 16 is disconnect from the tow vehicle hitch manually or by a second trailer jack secured to the tow bar 16; whereupon, the coupler 18 of the tow bar 16 is disposed upon a selected surface area 12 and the trailer jack 94 connected to the corner support member 86 is extended until the base 104 of the trailer jack 94 engages the ground 14, thereby enabling the wheel rails 80 to be disconnected from the outer plate 84 of the corner support member 86, and the trailer wheels 81 to be correspondingly repositioned upon the ground surface 14, whereby, the receiver frame 24 with the attached portable toilet 12 is disposed upon a selected surface area 14.

BRIEF DESCRIPTION OF THE DRAWINGS

The foregoing invention and its advantages may be readily appreciated from the following detailed description of the preferred embodiment, when read in conjunction with the accompanying drawings in which:

FIG. 1A1 is an exploded top perspective view of a receiving frame of the portable toilet trailer of FIG. 1.

FIG. 2A1 is the side elevation view of FIG. 2A, but with the trailer jack retracted; first ends of wheel rails elevated above the receiving frame; the receiving frame disposed upon the ground surface; and trailer wheels angularly disposed upon the ground surface in accordance with the present invention.

DESCRIPTION OF THE PREFERRED EMBODIMENT

Figure 1:
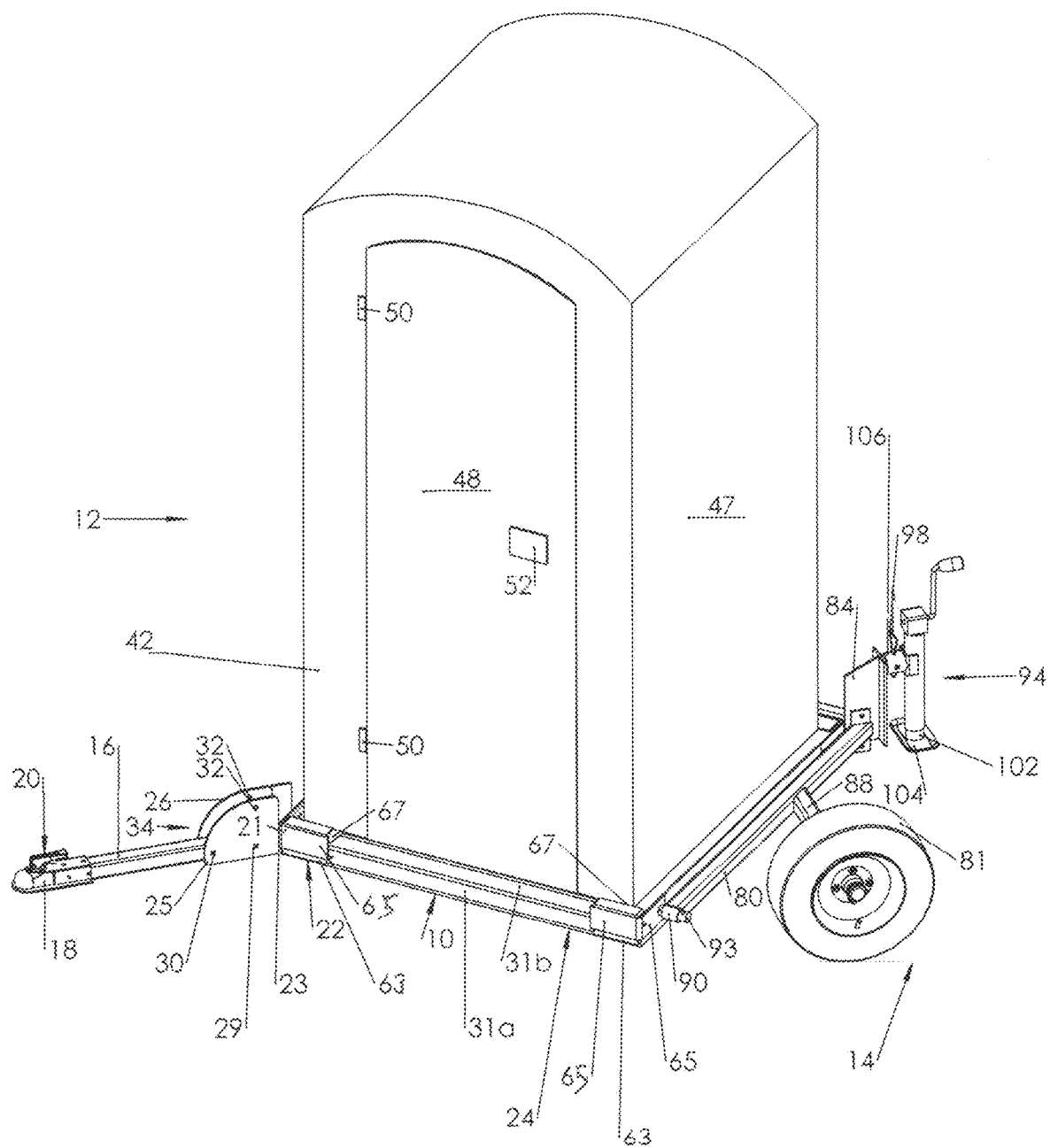
FIG. 1 is a top perspective view of an adjustable elevation portable toilet trailer with a trailer coupler elevated above ground when connected to a tow vehicle, and with a portable toilet detachably secured to a toilet receiving frame of the adjustable elevation portable toilet trailer in accordance with the present invention.
Figure 2:
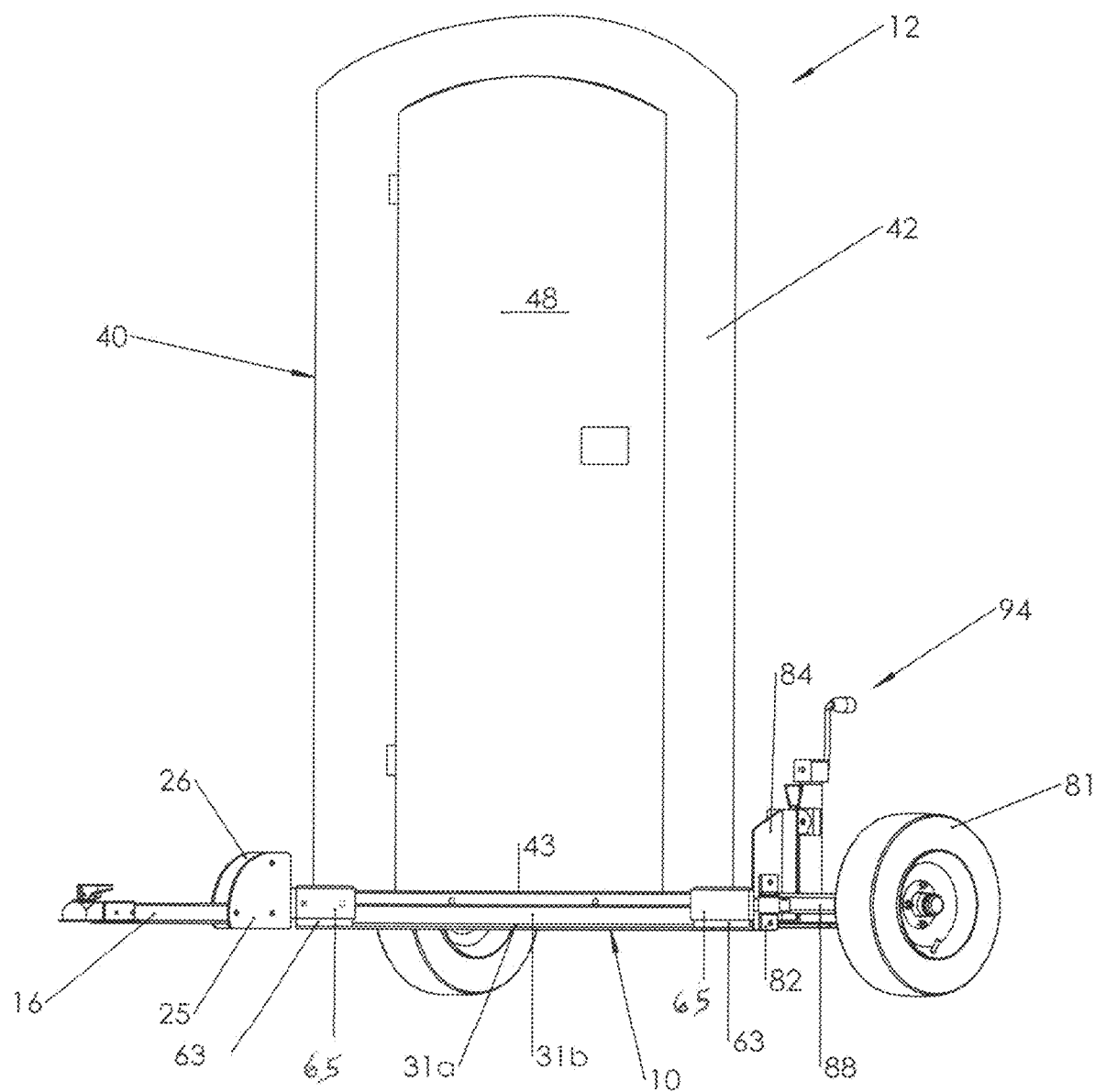
FIG. 2 is door side elevation view of FIG. 1.
Figure 3:
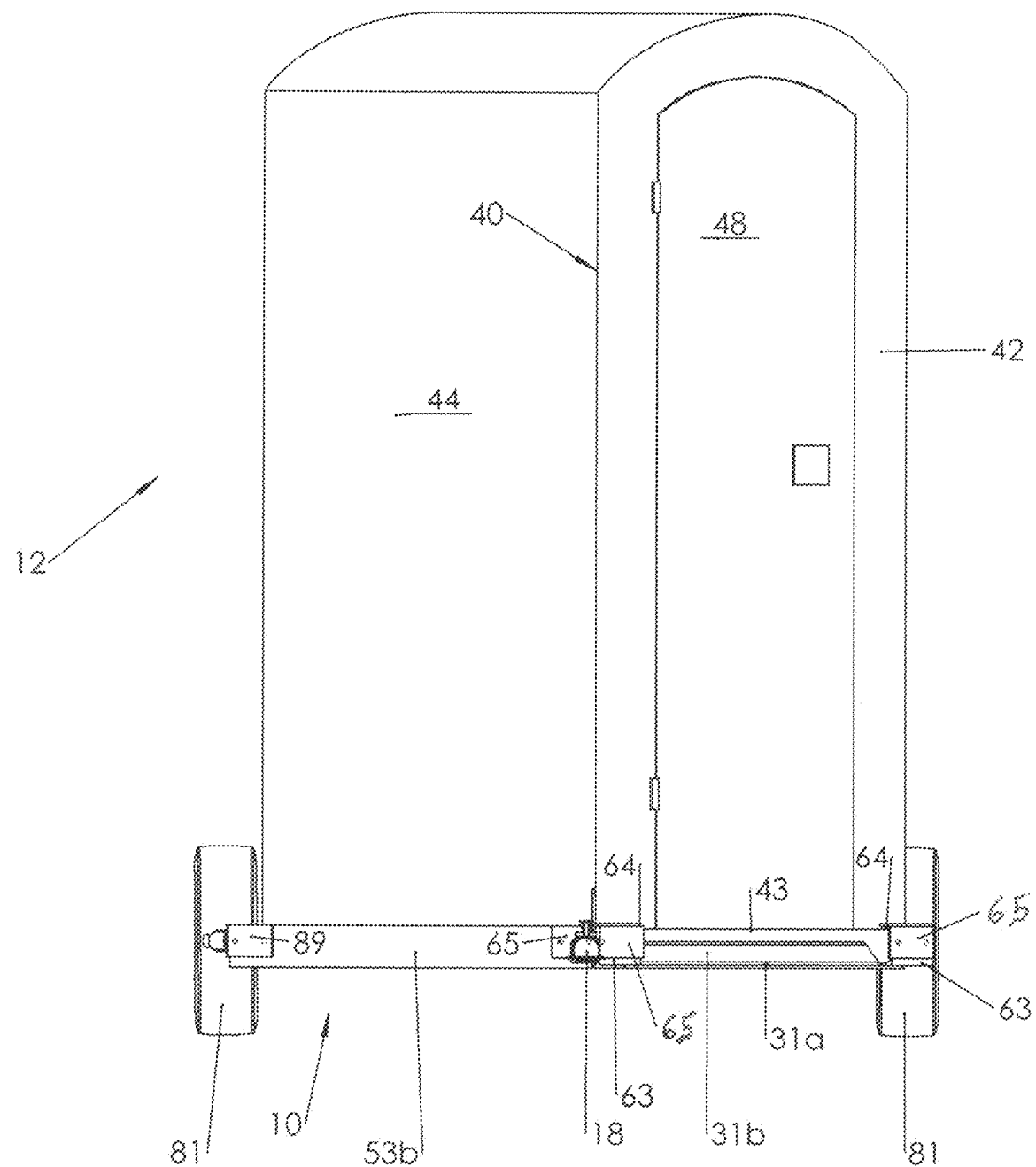
FIG. 3 is a front elevation view of the adjustable elevation portable toilet trailer of FIG. 1.
Figure 3A:
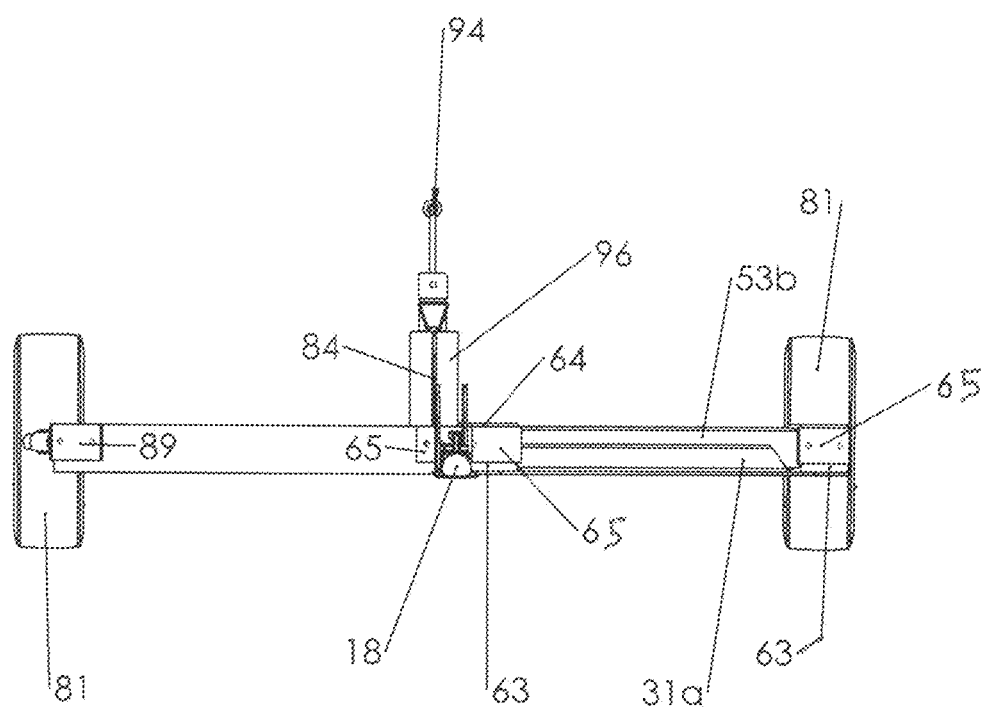
FIG. 3A is the front elevation view of FIG. 3, but with the portable toilet removed from the trailer.
Figure 3B:
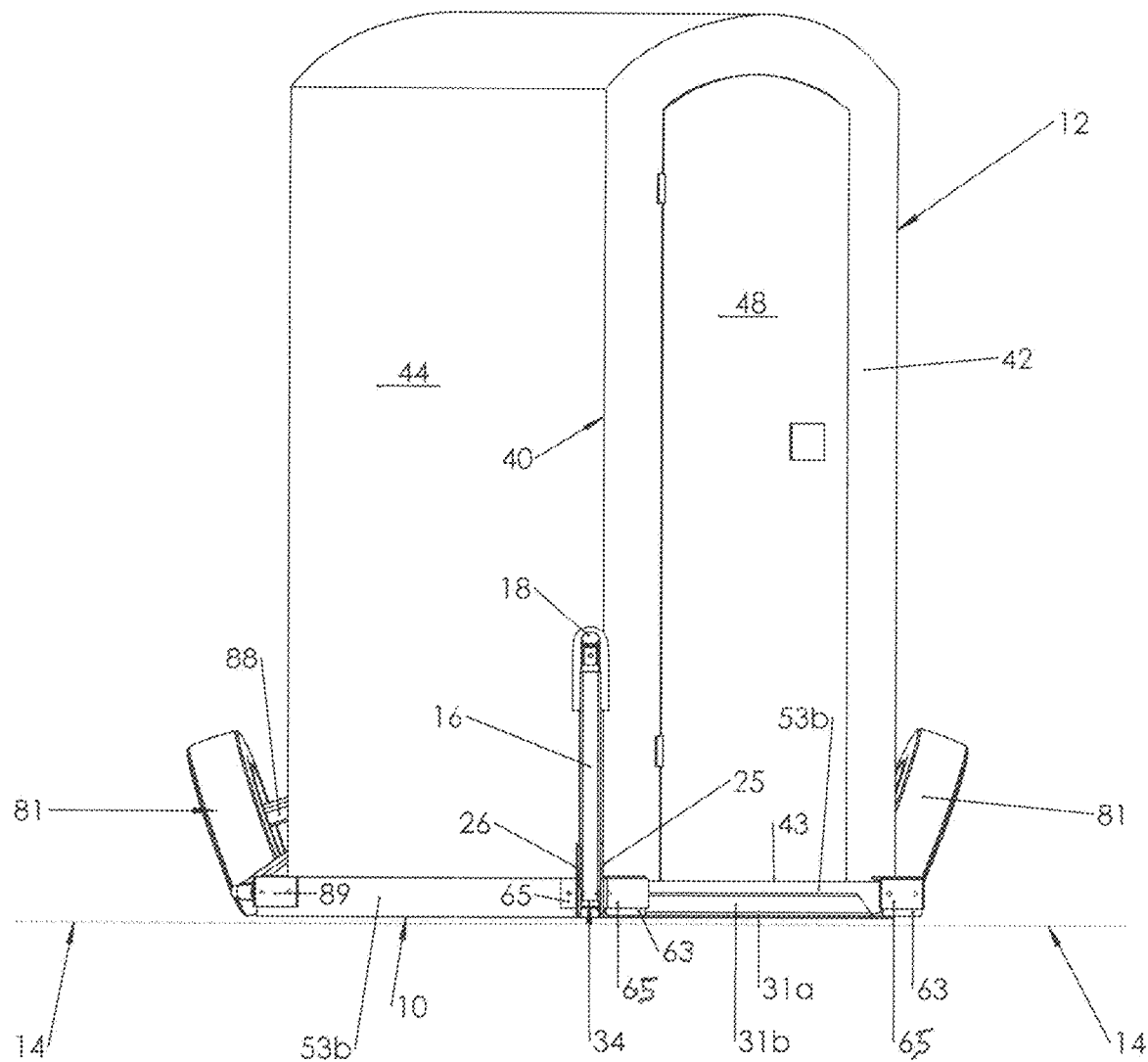
FIG. 3B is the front elevation view of FIG. 3, but with the trailer disposed upon the ground surface, the tow bar rotated to a vertical position, and the trailer wheels disposed in an angular position upon the ground surface.
Figure 3C:
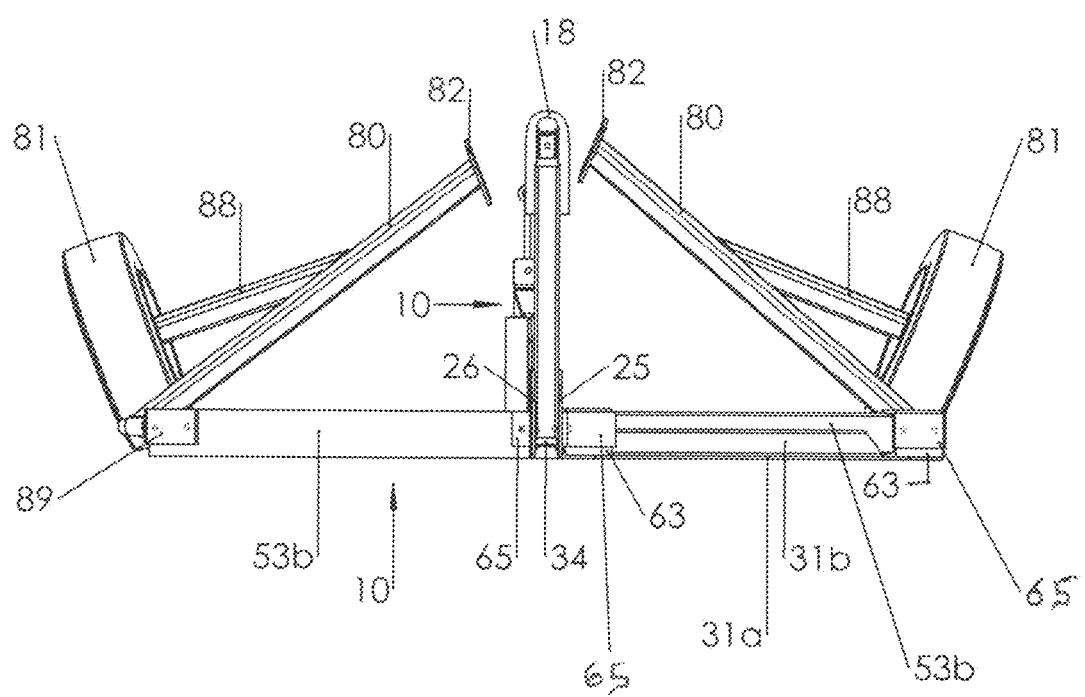
FIG. 3C is the front elevation view of FIG. 3B, but with the portable toilet removed from the trailer.
Figure 4:
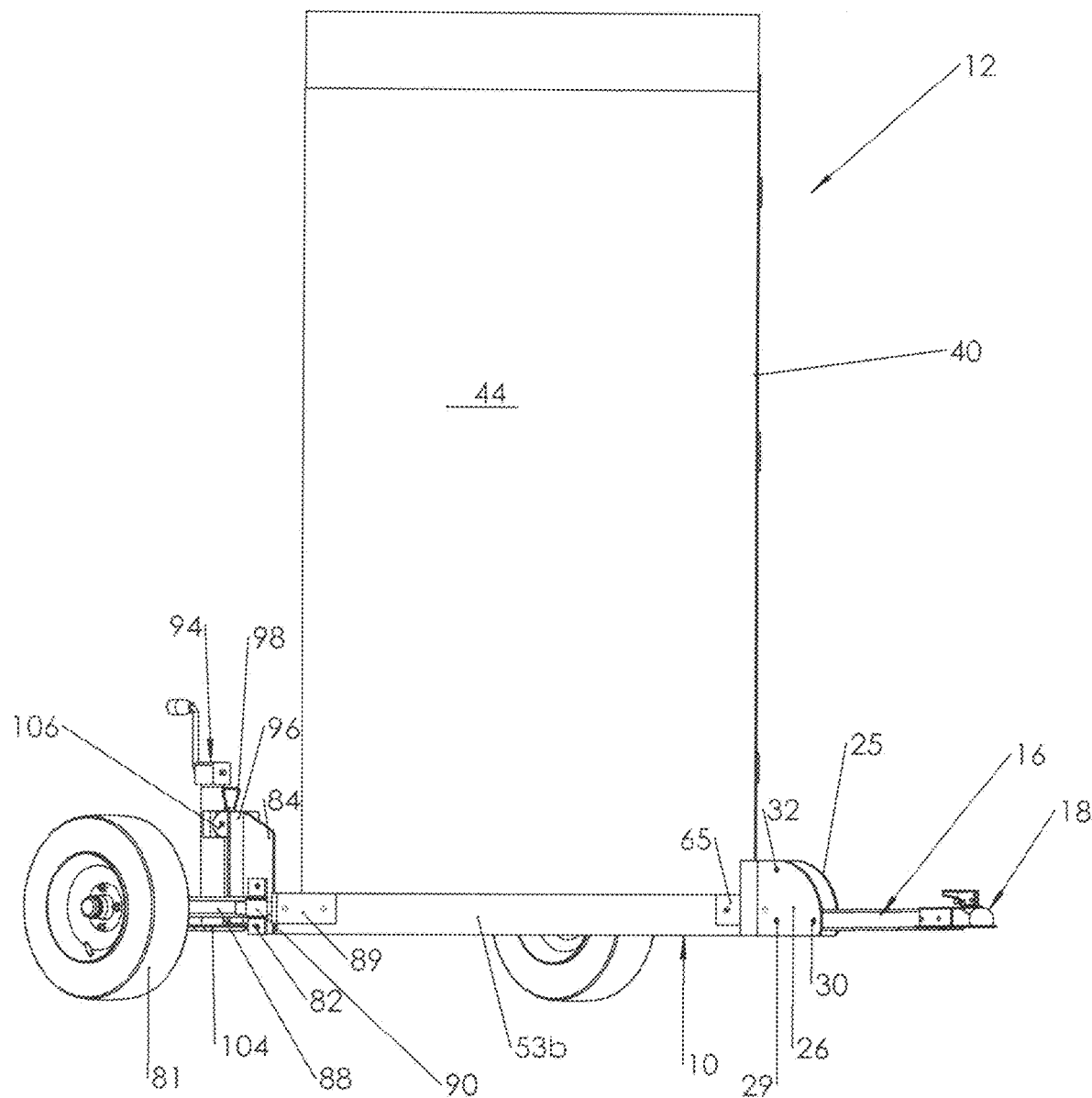
FIG. 4 is a second side elevation view of FIG. 1
Figure 4A:
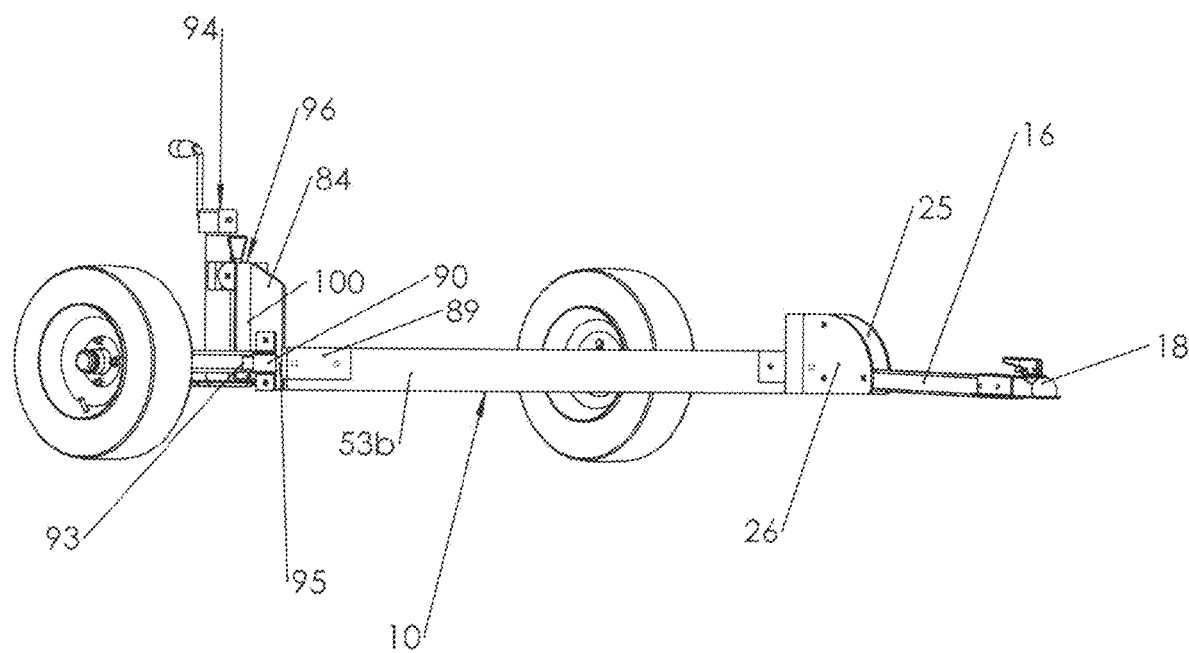
FIG. 4A is the side elevation view of FIG. 4, but with the portable toilet removed from the trailer.
Figure 4B:
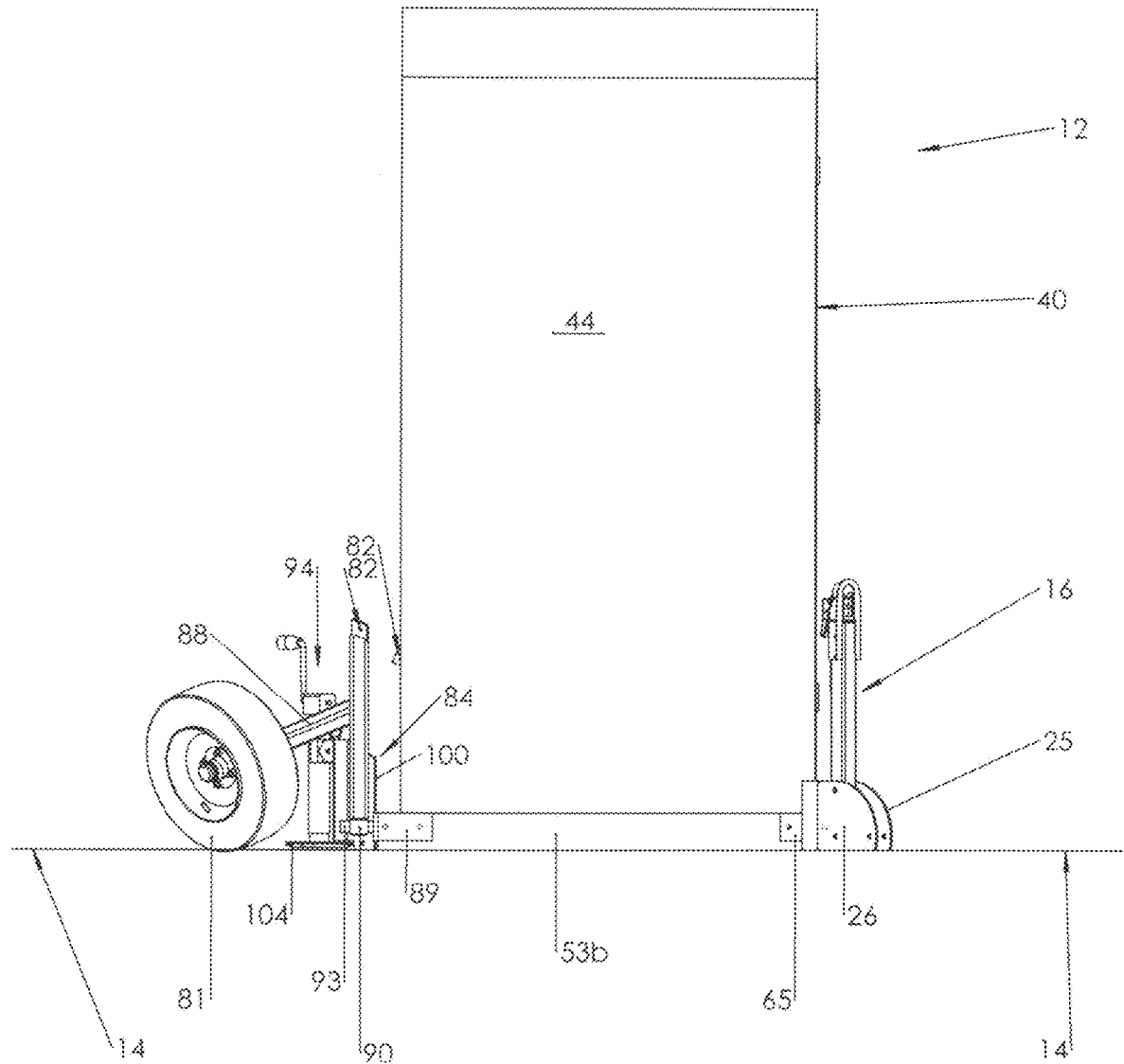
FIG. 4B is the second side elevation view of FIG. 4, but with the trailer disposed upon the ground surface, the tow bar rotated to a vertical position, and the trailer wheels disposed in an angular position upon the ground surface.
Figure 4C:
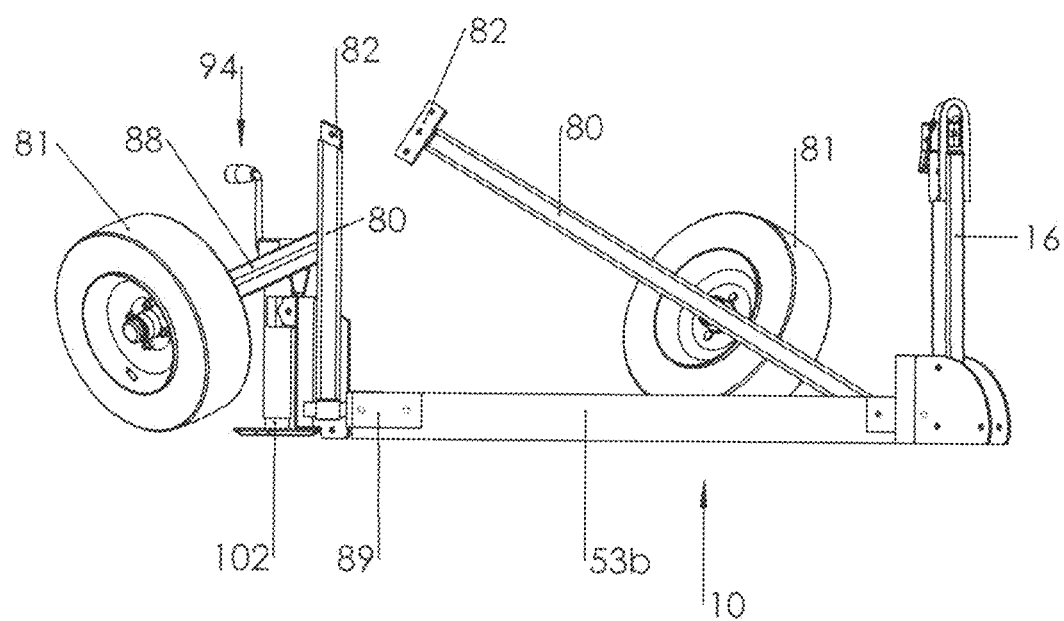
FIG. 4C is the second side elevation view of FIG. 4B, but with the portable toilet removed from the trailer.
Figure 5:
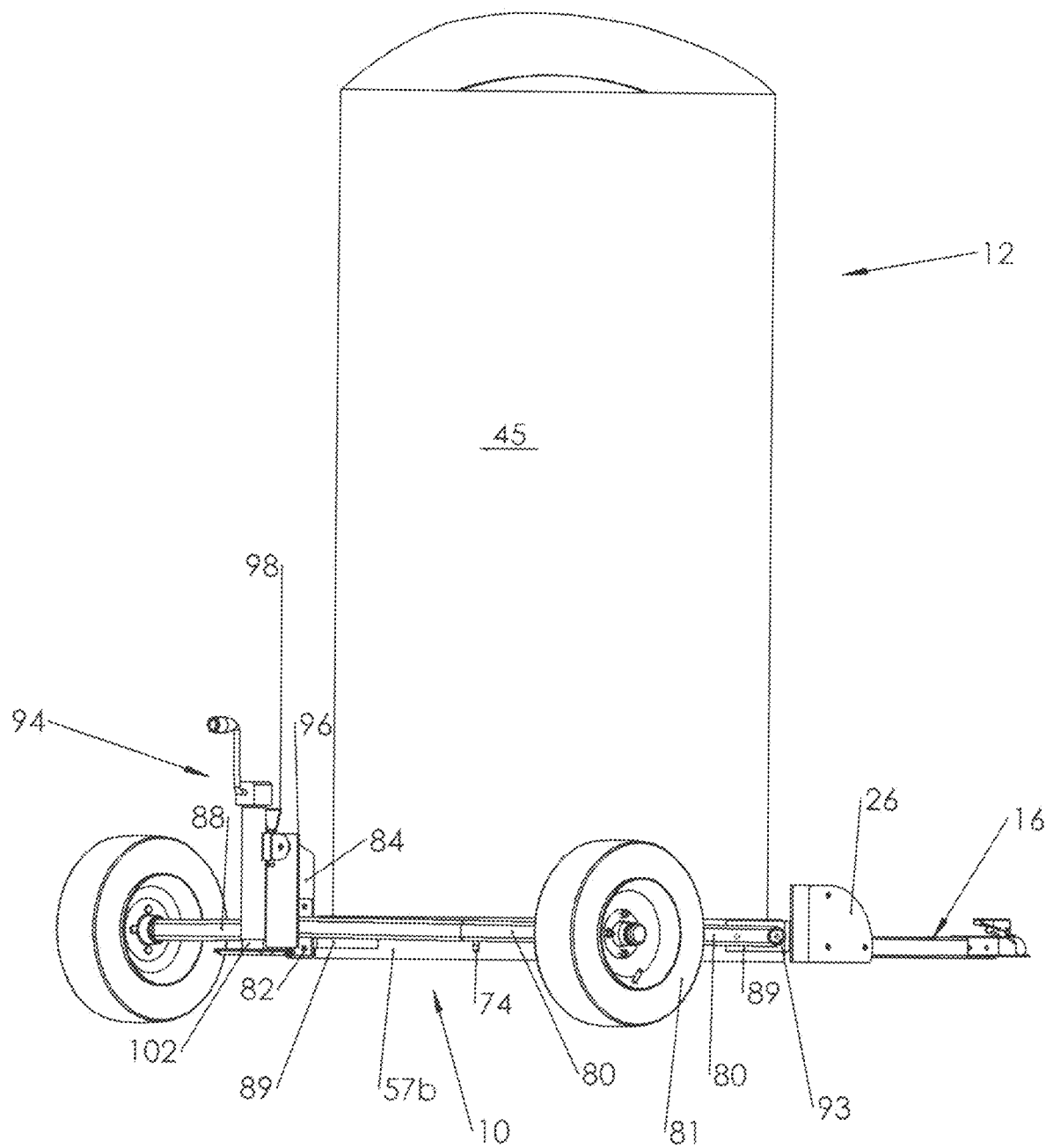
FIG. 5 is a third side elevation view of FIG. 1
Figure 5A:
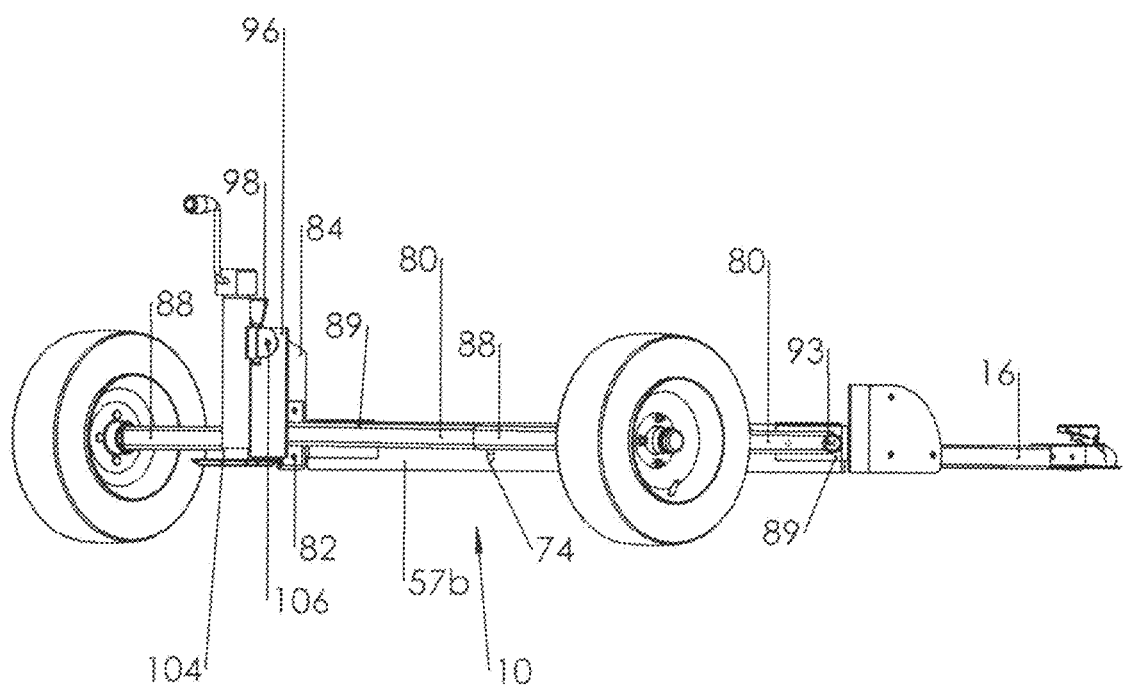
FIG. 5A is the third side elevation view of FIG. 5, but with the portable toilet removed from the trailer.
Figure 5B:
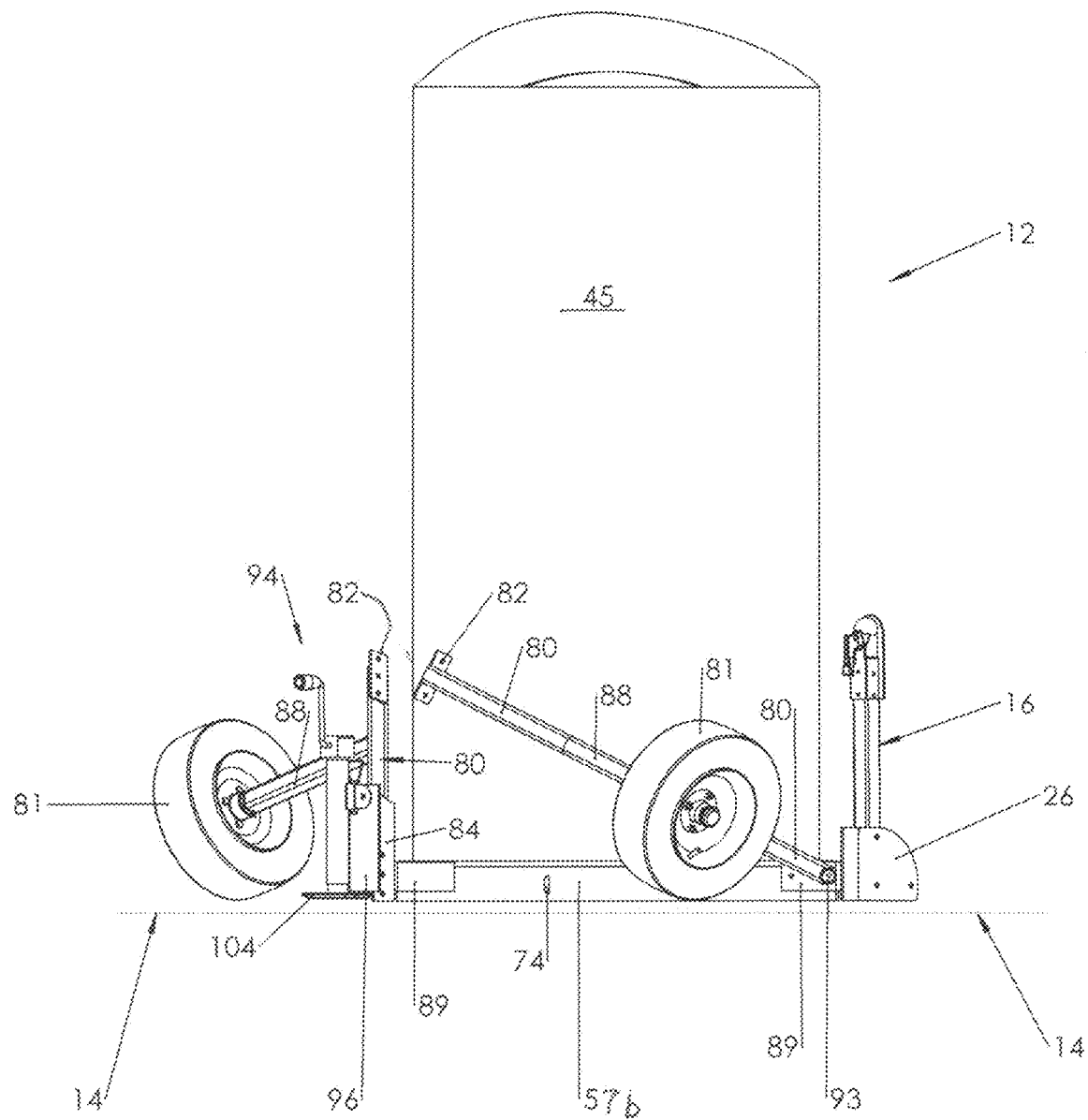
FIG. 5B is the third side elevation view of FIG. 5, but with the trailer disposed upon the ground surface, the tow bar rotated to a vertical position, and the trailer wheels disposed in an angular position upon the ground surface.
Figure 5C:
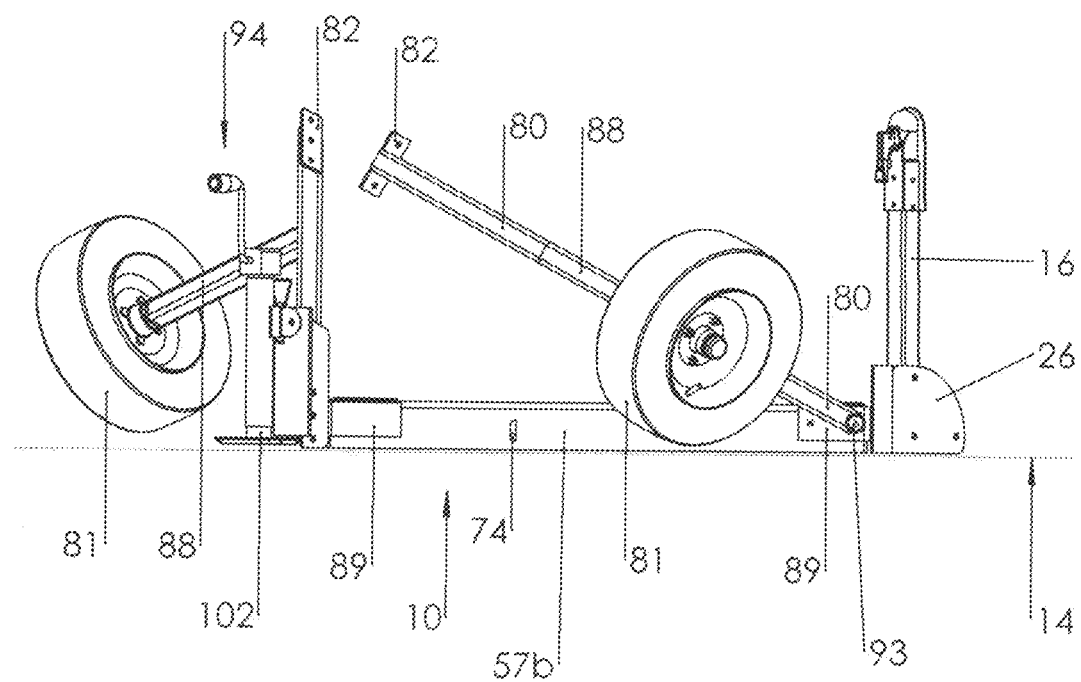
FIG. 5C is the third side elevation view of FIG. 5B, but with the portable toilet removed from the trailer.
Figure 6:
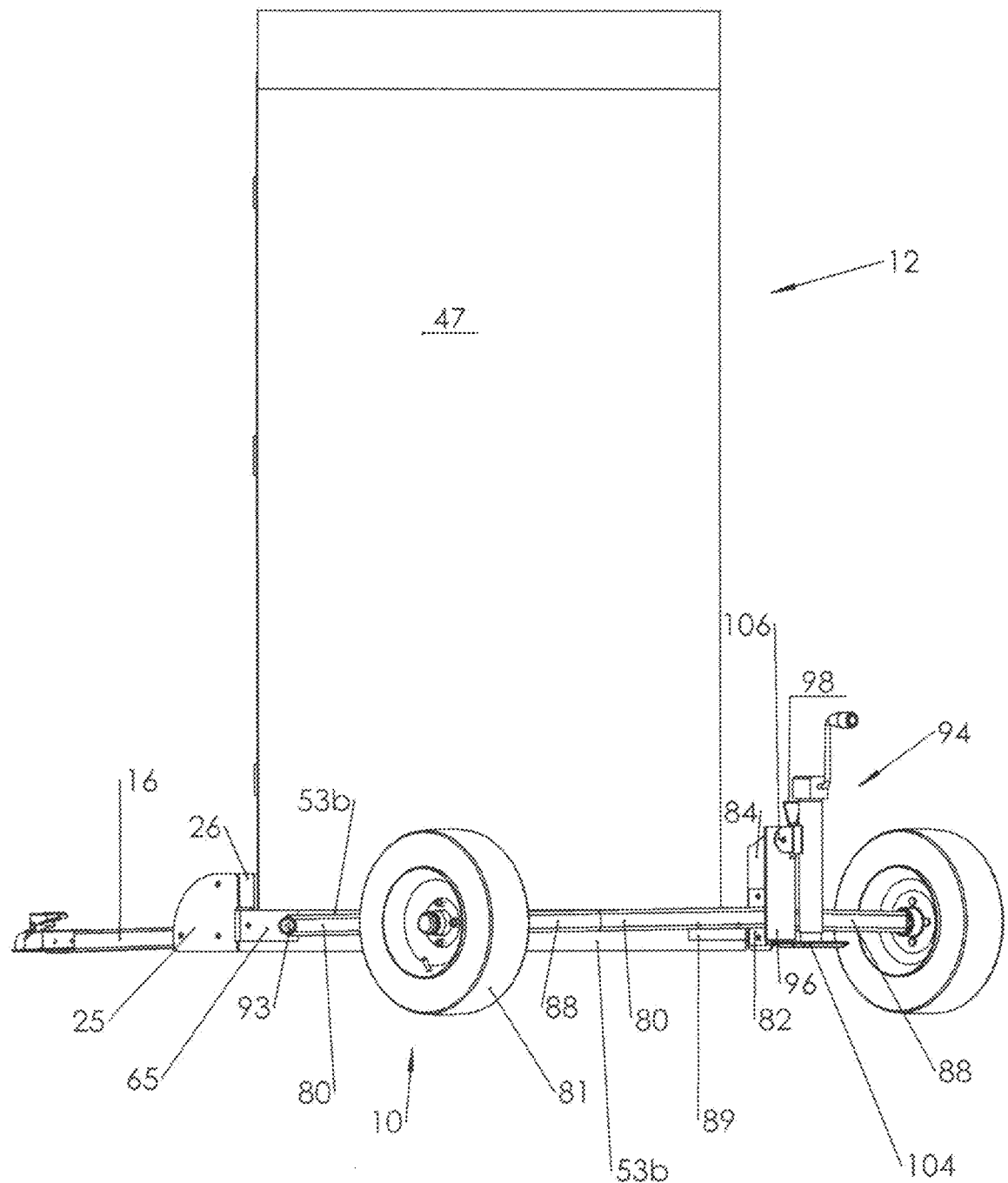
FIG. 6 is a fourth side elevation view of FIG. 1
Figure 6A:
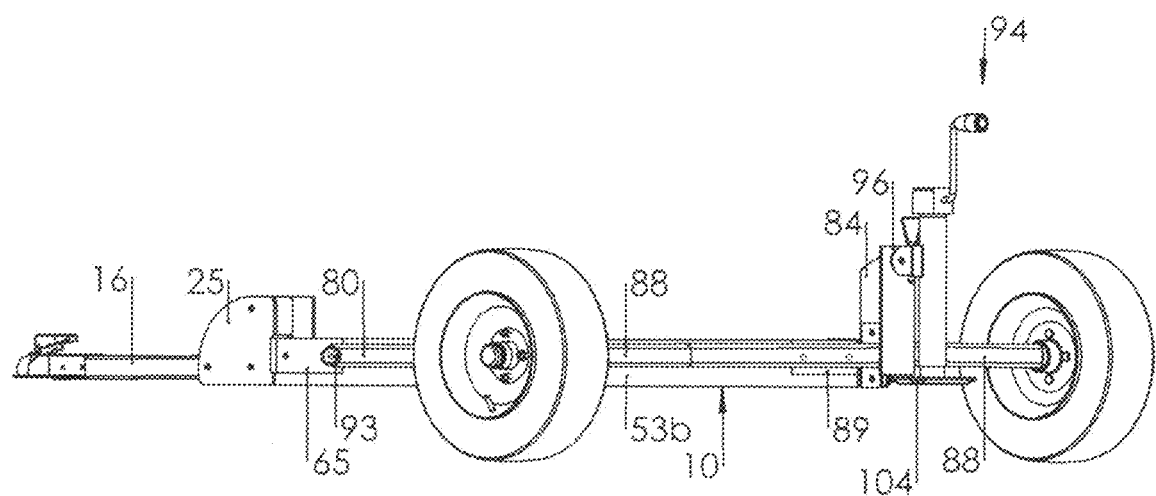
FIG. 6A is the fourth side elevation view of FIG. 6, but with the portable toilet removed from the trailer.
Figure 6B:
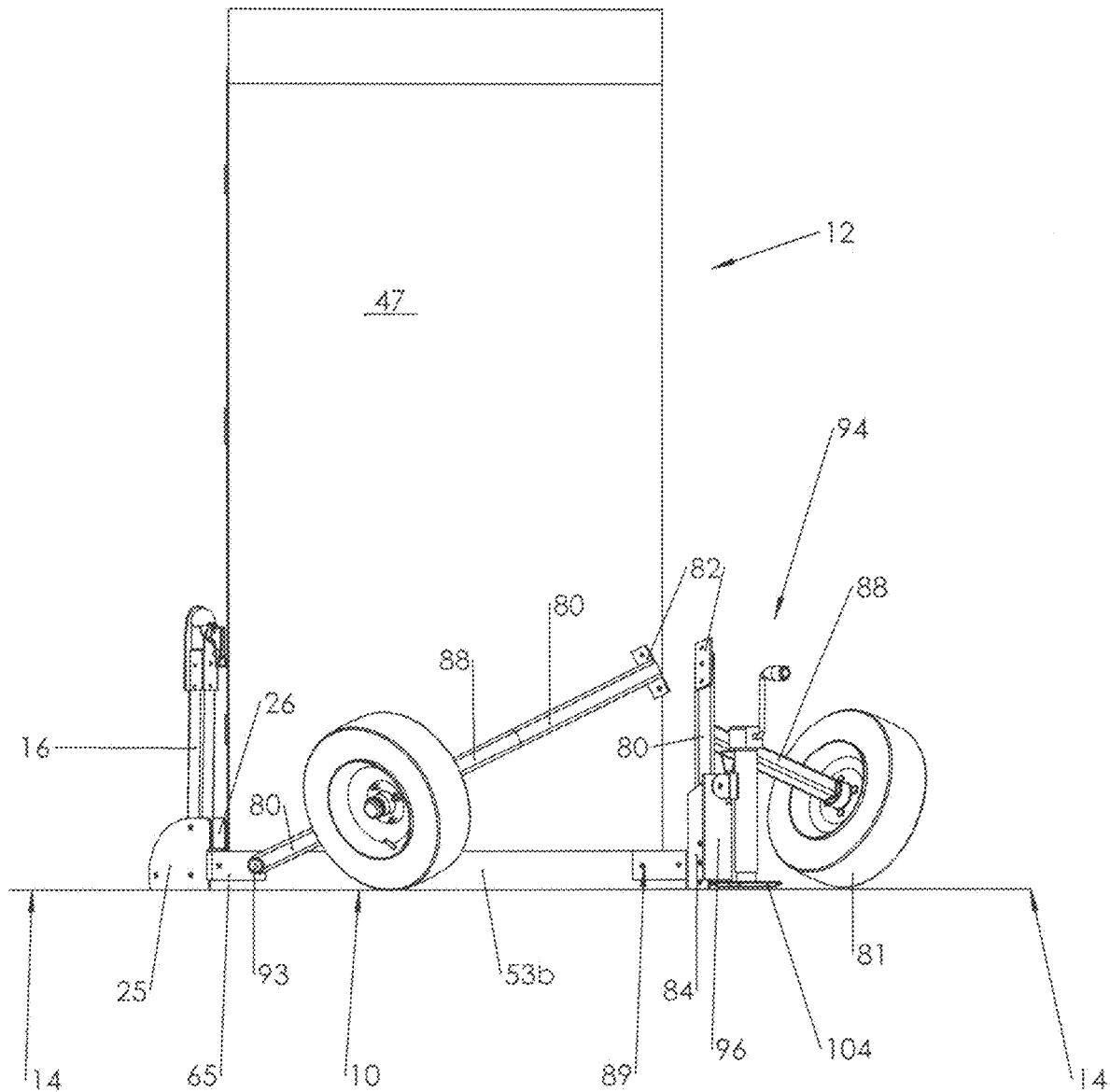
FIG. 6B is the fourth side elevation view of FIG. 6, but with the trailer disposed upon the ground surface, the tow bar rotated to a vertical position, and the trailer wheels disposed in an angular position upon the ground surface.
Figure 6C:
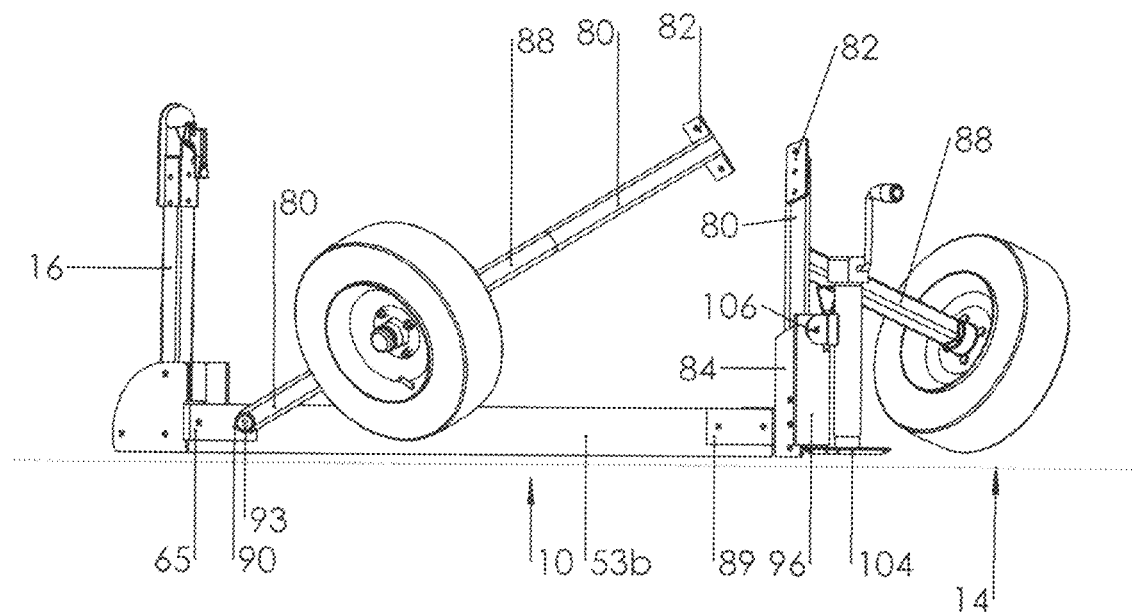
FIG. 6C is the fourth side elevation view of FIG. 6B, but with the portable toilet removed from the trailer.

Referring to the figures and in particular to FIGS. 1-3, an elevation adjustable portable toilet trailer in accordance with the present invention is denoted as numeral 10. Referring to the figures, the carbon steel trailer 10 is detachably secured to a tow vehicle hitch that is secured to a tow vehicle (not depicted) for towing a portable toilet 12 (well known to those of ordinary skill in the art and not part of the embodiment) to a destination where the portable toilet 12 is disposed upon a substantially horizontal ground surface area 14. Although carbon steel is the preferred metal for fabricating the trailer 10, alternative materials including aluminum and similar relatively light weight materials can be used. The trailer 10 includes a tow bar 16 having a coupler 18 (well known to those of ordinary skill in the art) for detachably securing an outer end 20 of the tow bar 16 the tow vehicle hitch. The tow bar 16 includes an inner end 34 pivotally attached to a front corner 22 of a carbon steel receiving frame 24 that detachably secures the portable toilet 12 to the trailer 10. The inner end 34 is pivotally secured to the front corner 22 via an aligning plate 25 and an outer plate 26 parallel to the aligning plate 25 and both integrally joined to the front corner 22, whereby an inner edge 21 of the aligning plate 25 is integrally joined (preferably via welding) to an outer edge 23 of the front corner 22, resulting in the aligning plate 25 and the outer edge 23 of the front corner 22 aligned with a diagonal line 36 of the receiving frame 24. The positioning of the aligning plate 25 enables a user of the trailer 10 to slide a portable toilet 12 upon a front angle bar member 31 of the receiving frame 24, thereby avoiding the aligning plate 25 and ultimately disposing the portable toilet 12 upon the receiving frame 24. The plates 25 and 26 include aligned apertures 29 that receive a locking bolt or pin and cotter pin combinations 27, whereby the tow bar 16 can be pivoted in substantially horizontal or vertical positions by the user.

To horizontally lock the tow bar 16 position, a second bolt or pin and cotter pin combinations 28 is inserted through one of two aligned apertures 30 in the aligning and outer plates 25 and 26, then through aligned apertures (not depicted) in the inner end 34 of the tow bar 16, then through the opposite aperture 30 in the opposite plate 25 and 26; whereupon, a second retaining nut (not depicted) is rotationally secured upon the second bolt 28 until the second nut engages a cooperating outer wall 35 of one of the two plates 25 and 26. To vertically lock the position of the tow bar 16, the second bolt 28 is inserted through one of two aligned apertures 32 in the aligning and outer plates 25 and 26, then through the aligned apertures (not depicted) in the inner end 34 of the tow bar 16, then through the opposite aperture 32 in the opposite plate 25 and 26; whereupon, the second retaining nut (not depicted) is rotationally secured upon the second bolt 28 until the second nut engages a cooperating outer wall 35 of one of the two plates 25 and 26.

Figure 1A:
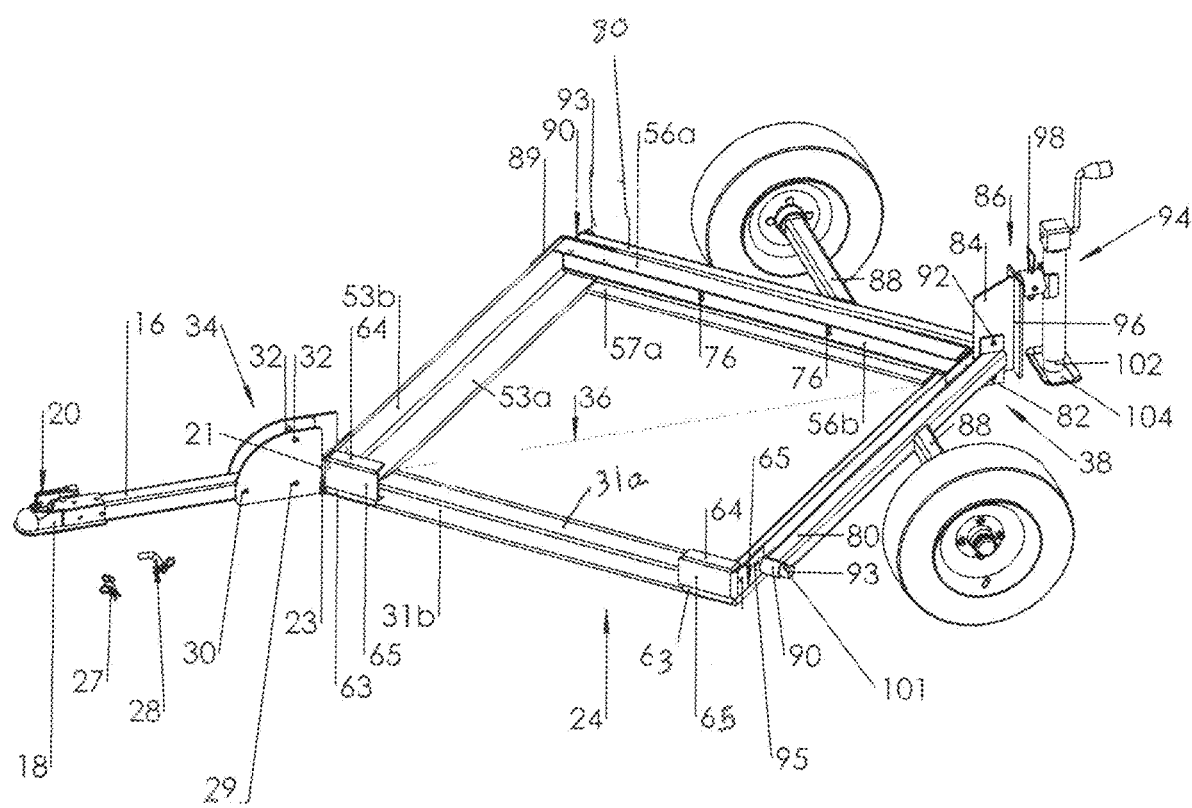
FIG. 1A is the perspective view of FIG. 1, but with the portable toilet removed from the trailer.
Figure 1B:
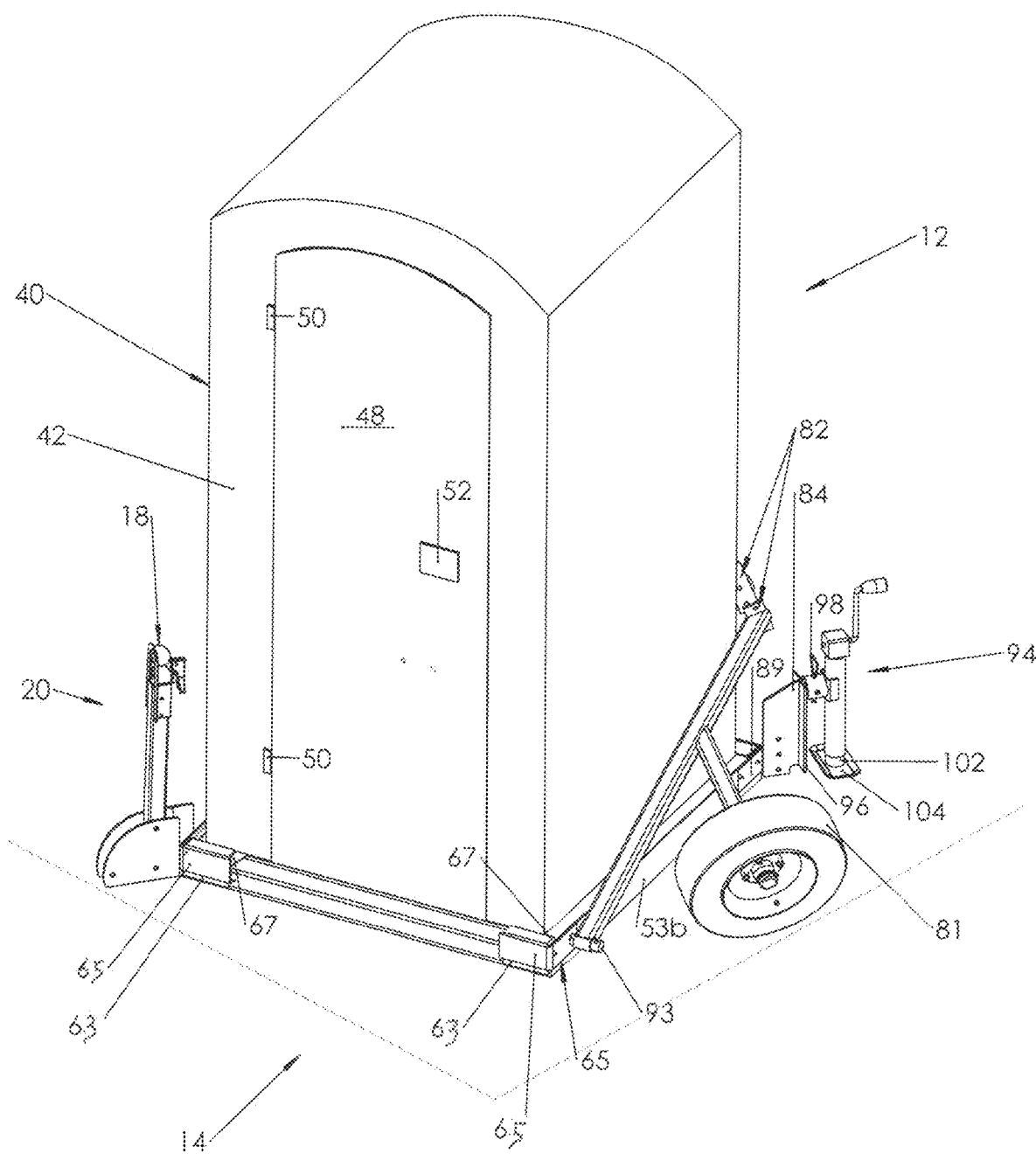
FIG. 1B is the perspective view of FIG. 1, but with the portable toilet trailer disposed upon a ground surface, a tow bar rotated to a vertical position, and the trailer wheels disposed in an angular position upon the ground surface.
Figure 7:
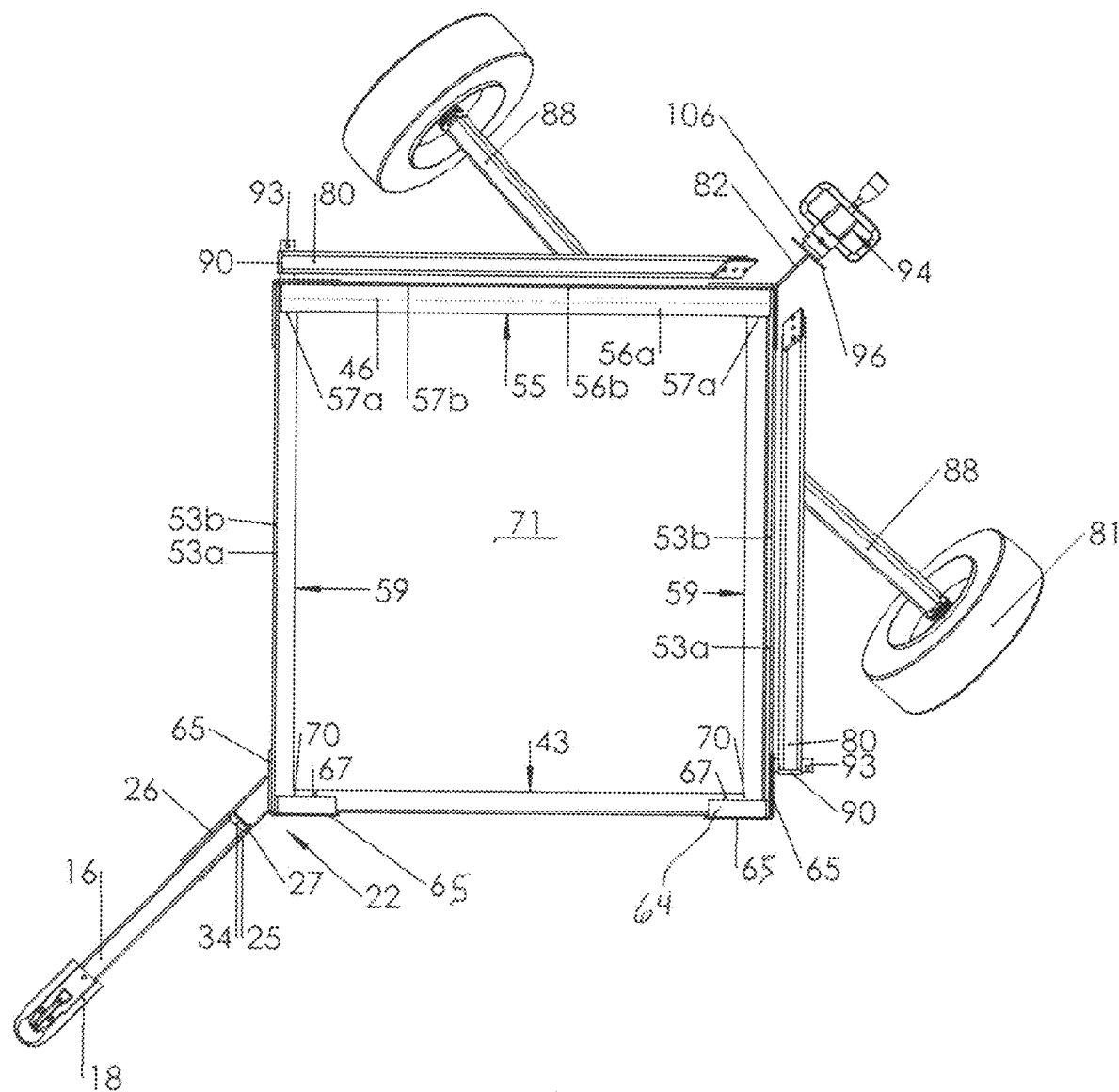
FIG. 7 is a top view of FIG. 1, but with only a base portion of the portable toilet depicted.
Figure 7A:
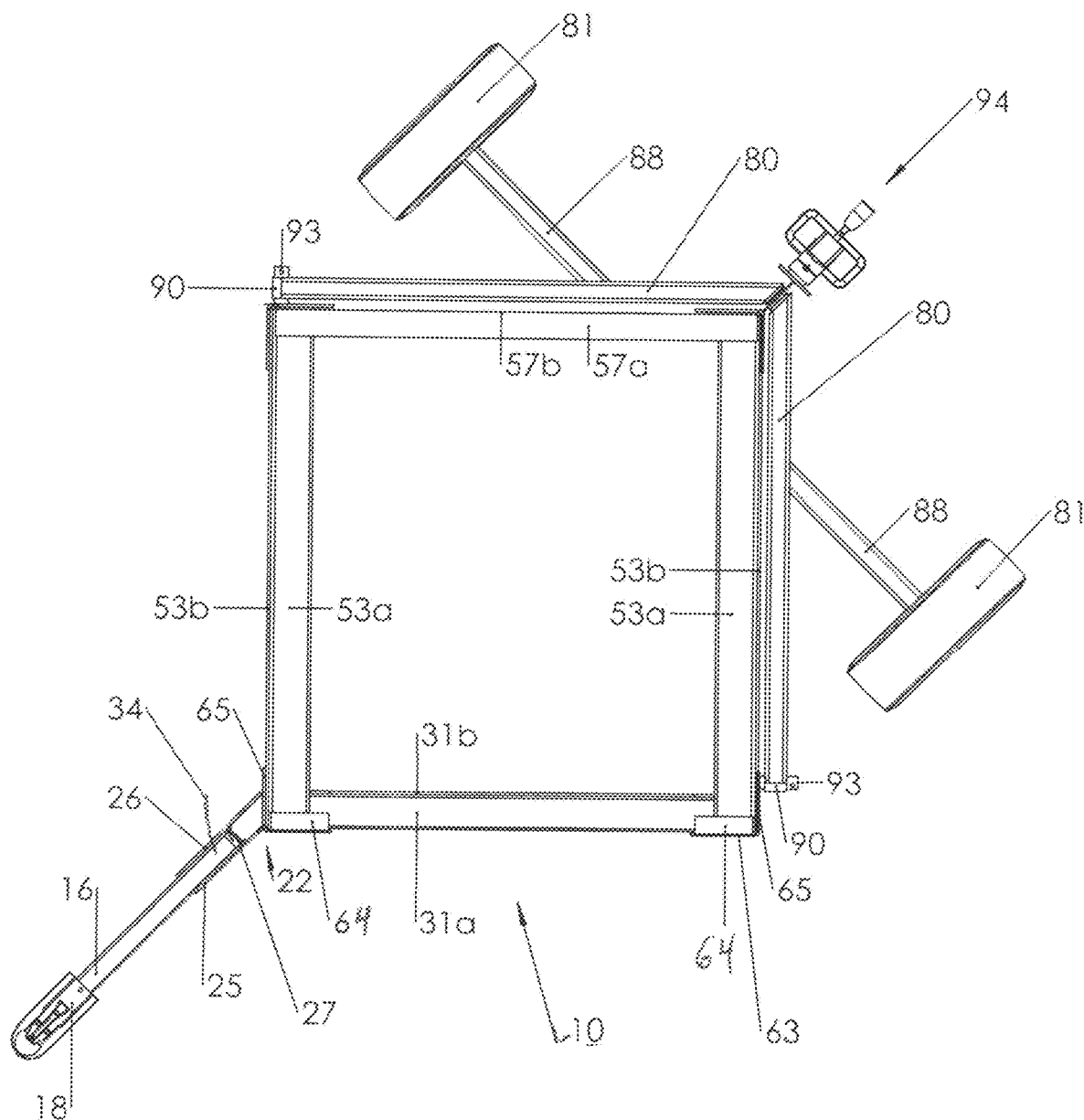
FIG. 7A is the top view of FIG. 7, but with the base portion of the portable toilet removed from the trailer.
Figure 7B:
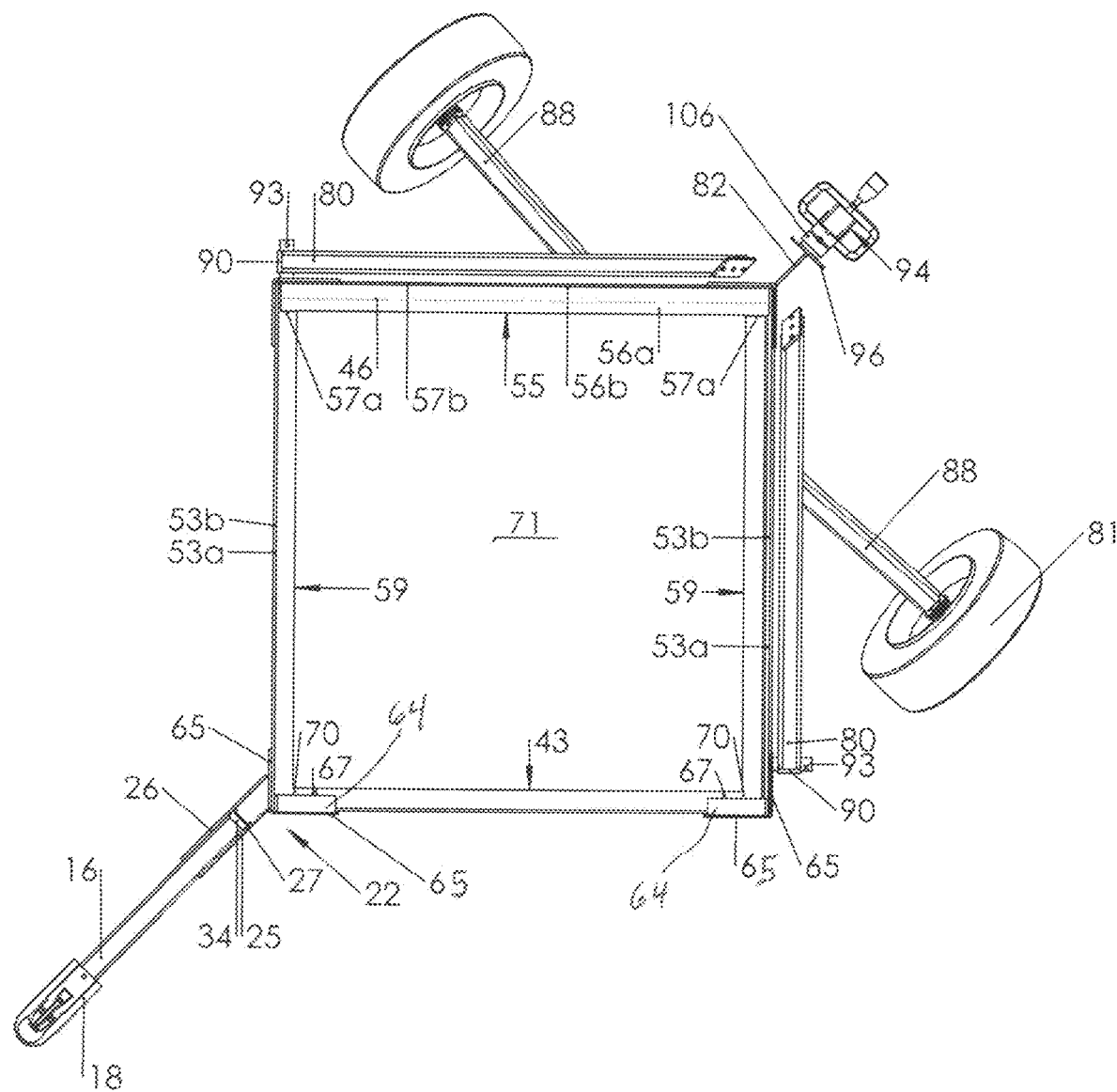
FIG. 7B is the top view of FIG. 7, but with the trailer disposed upon the ground surface, the tow bar rotated to a vertical position, and the trailer wheels disposed in an angular position upon the ground surface.
Figure 7C:
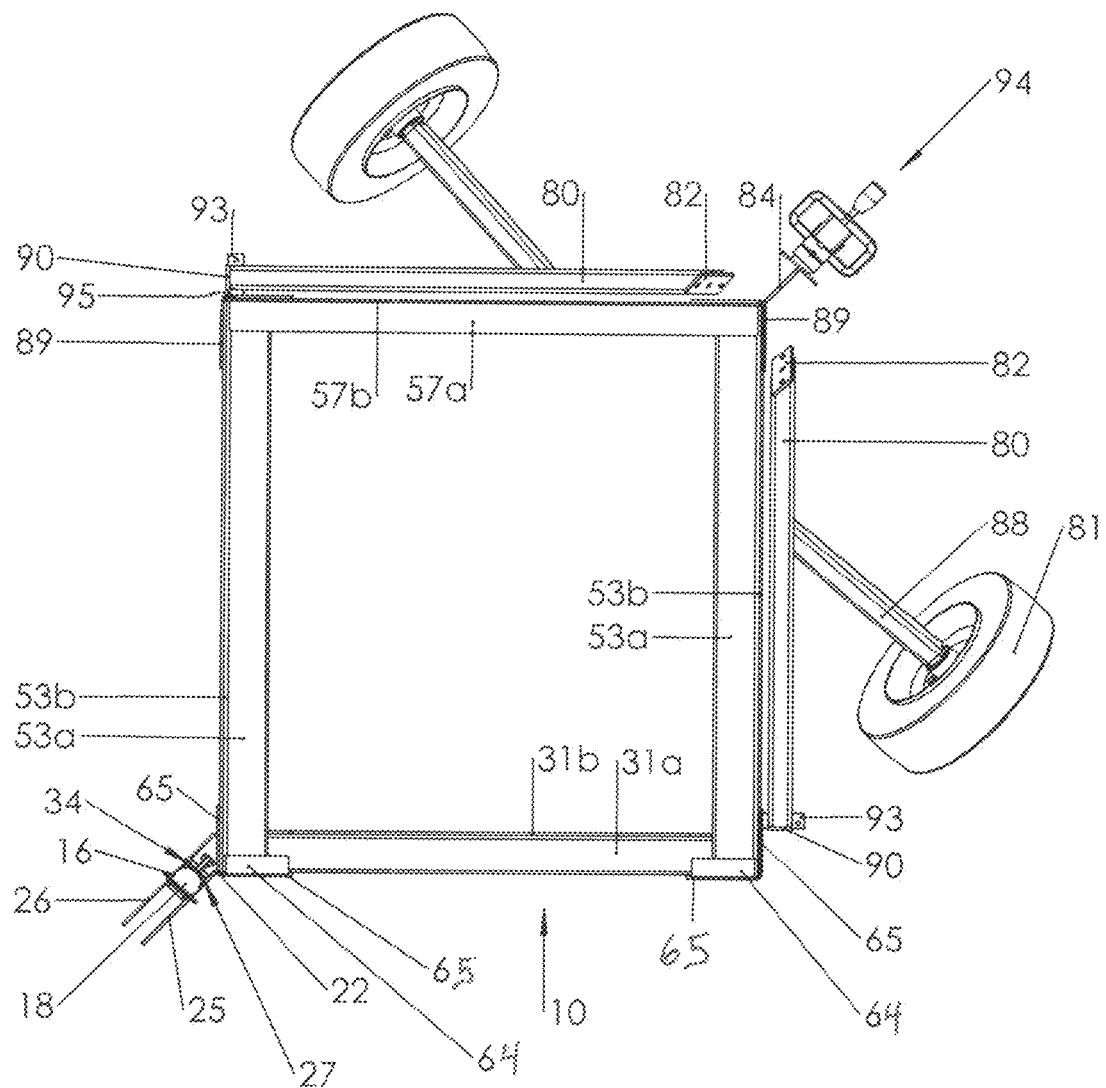
FIG. 7C is the top view of FIG. 7B, but with the base portion of the portable toilet removed from the trailer.

The receiving frame 24 of the trailer 10 includes a substantially rhombus configuration, when taking a top perspective view of the trailer 10 (FIG. 1A) or a substantially square configuration, when taking a top view of the trailer (FIG. 7A); whereby, the tow bar 16, front corner outer edge 23 and a back corner 38 of the receiving frame 24 are axially aligned with the diagonal line 36 of the rhombus configured receiving frame 24. The configuration of the trailer 10 positions the portable toilet 12, whereby air flow generated via the tow vehicle pulling the trailer forward, engages a front corner 40 of the portable toilet 12, then flows laminarly across an angled planar door side 42 and an angled planar second side 44 (FIG. 3) of the portable toilet 12 relative to the linear position of the tow bar 16; thereby reducing wind resistance when compared to a portable toilet orientated, whereby the door side 42 is perpendicularly disposed relative to the tow bar 16. Wind perpendicularly engaging the door side 42 of a portable toilet 12 results in a turbulent air flow upon the surface of the door side 42 that can cause a door 48 to vibrate and damage the door handle locking mechanism (not depicted) and/or cause the door 48 to open when a relatively strong wind engages the portable toilet 12 being towed at a relatively fast speed. The door side 42 of the portable toilet 12 includes a door 48 having hinges 50 disposed adjacent to the front corner 40, and having a door handle 52 disposed distally from the front corner 40 relative to the hinges 50, whereby the laminar air flow across the door 48 pivotally urges the door 48 into the door side 42 via the placement of the hinges 50 adjacent to the front corner 40 of the portable toilet. Third and fourth sides 45 and 47 of the portable toilet 12 are not substantially affected by wind flow engaging the door and first sides 42 and 44 of the portable toilet 12.

The dimensions of the receiving frame 24 are determined by a base portion 71 of a selected portable toilet 12. Typical dimensions for the angle bar members 31, 53 and 57 include one-quarter inch thick steel side angle bar members 53 having horizontal and vertical portions 53a and 53b (see FIGS. 1A and 1A1) four feet in length with four-inch lateral dimensions that are integrally joined (preferably via welding) to cooperating horizontal and vertical portions 31a and 31b of the front angle bar member 31 and cooperating horizontal and vertical portions 57a and 57b of a back angle bar member 57. The horizontal and vertical portions 31a and 31b of the front angle bar member 31 are fabricated from one-quarter inch thick steel having a three feet length. The horizontal portion 31a includes a four-inch lateral dimension and the vertical portion 3b has a one and three-quarter inch lateral dimension. The horizontal portion 57a of the back angle bar member 57 is manufactured from one-quarter inch thick steel, has about a forty-four inches length and about a two-inch lateral dimension. The vertical portion 57b has a four feet length and about three and one-half inch lateral dimensions.

The receiving frame 24 further includes horizontal portions 53a of the side angle bar members 53 and horizontal portion 57a of the back angle bar member 57 that provide a planar support base for outer bottom horizontal edge portions 59 of the base portion 71 of the portable toilet 12. The horizonal portion 57a of the back angle bar member 57 are dimensioned whereby recesses 57c are formed that enable edges of the horizontal portion 57a to be integrally joined to edges of the horizontal portion 53a of the side angle bar members 53, resulting in top walls of the horizontal portions 53a and 57a that cooperate with the horizontal portion 31a of the front angle bar member 31 to form a planar surface for outer bottom horizontal edge portions 59.

The vertical portions 53b, 31b and 57b of respective side angle bar members 53, front angle bar member 31 and back angle bar member 57 of the receiving frame 24 provide a stabilizing base for maintaining the position of the portable toilet 12 upon the horizontal members 54, 54a and 54b. The vertical portion 31b of the front angle bar member 31 is secured to the vertical portions 53b of the side angle bar members 53 via angled front corner members 65. The front corner members 65 promote a planar surface between the horizontal portions 31a and 53a of the front and side bar members 31 and 53, thereby maintaining engagement between the bottom of the base member 71 of the portable toilet 12 and the receiving frame 24 for improved trailer 10 stability when transporting the portable toilet 12. The vertical portion 57a of the back angle bar member 57 is secured to the vertical portions 53b of the side angle bar members 53 via angled back corner members 89, thereby maintaining the substantially square configuration of the receiving frame 24.

The door side 42 of the portable toilet 12 is detachably secured to the receiving frame 24 via front channels 63 integrally joined to the angled front corner members 65 that are integrally joined to cooperating edge portions of the front angle bar member 31 and respective side angle bar members 53, whereby bottom portions 63a are integrally joined to a top wall of the horizontal portion 31a of the front angle bar member 31. The front channels 63 slidably and snugly receive toe members 67 integrally formed to the front portion 43 of the base portion 71 of the portable toilet 12. The toe members 67 slidably engage bottom walls 62 of horizontal extension portions 64, which are integrally joined to vertical portions 68 of the front channels 63, as the base portion 71 is slid forward upon the horizontal portions 53a of the side angle bar members 53 until the toe members 67 engage the vertical portion 31b of the front angel bar member 31. The bottom walls 62 of the horizontal extension portions 64 are disposed above the vertical portion 31b of the front angle bar member 31 a distance that promotes a relatively "tight" insertion of the toe members 67 into the front channels 63 between the bottom walls 62 and the top edge of the vertical portion 31b.

A back base portion 46 of the portable toilet 12 is detachably secured to the receiving frame 24 via an angled locking bar 56 having a vertical portion 56b detachably secured to the vertical portion 57b of the back angle bar member 57 via bolts 72 inserted through vertical slots 74 in the vertical portion 57b and extending through vertical slots 76 in the vertical portion 56b of the locking bar 56. The locking bar 56 includes a horizontal portion 56a that ultimately engages a top horizontal back edge portion 55 of the base portion 71 of the portable toilet 12, whereby the vertical slots 74 and 76 cooperate to vertically and adjustably position the locking bar 56 to engage and maintain the horizontal portion 56a upon the top horizontal back edge portion 55 via nuts (not depicted) rotationally secured to the bolts 72, until the nuts engage an inner vertical side wall 79 of the vertical portion 56b. The nuts are manually rotated when the receiving frame 24 is elevated above the ground surface 14 a distance that enables a user's hand to reach under the frame 24. The locking bar 56 cooperates with the front channels 63 to maintain the position of the base portion 71 of the portable toilet 12 upon the receiving frame when transporting the portable toilet 12 via a tow vehicle.

The elevation adjustable portable toilet trailer 10 includes at least two wheel rails 80 with each wheel rail 80 having a least one trailer wheel 81 secured to the wheel rail 80. The wheel rails 80 include first ends 82 detachably secured to an inner plate 84 of a corner support member 86 via fasteners 92 (preferably bolt and nut combinations) that engage both cooperating first ends 82 of the wheel rails 80 and the inner plate 84 of the corner support member 86. Each wheel rail 80 is integrally joined to an extension member 88 that is detachably secured to a trailer wheel 81. The wheel rails 80 include pivoting second ends 90 opposite a corresponding first end 82. The second ends 90 are cylindrically configured with an aperture that receives a pivot pin 93 having an inner end 95 welded to a respective outer side wall 91 of a cooperating front corner member 65 and a cooperating back corner member 89. The second ends 90 are pivotally retained upon the pivot pins 93 via cotter pins 101.

Figure 1C:
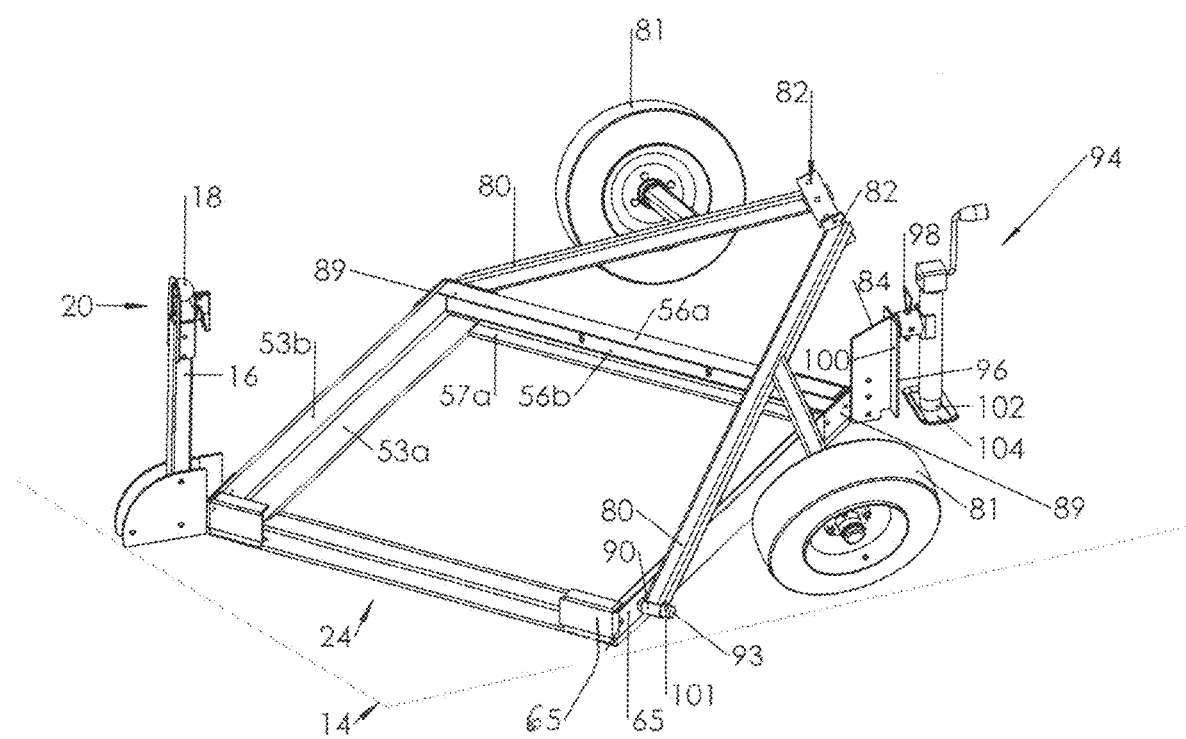
FIG. 1C is the perspective view of FIG. 1B, but with the portable toilet removed from the trailer.

The first ends 82 of the wheel rails 80 are allowed to pivot above the receiving frame 24 of the trailer 10 (FIG. 1C) after the first ends 82 are separated from the inner plate 84 of the corner support member 86 via the removal of the fasteners 92; whereupon, the receiving frame 24 is ultimately disposed upon the ground surface, and the trailer wheels 81 are correspondingly repositioned angularly upon the ground surface 14 due to the extension members 88 forming acute angles with the wheel rails 80 and the ground surface 14 and the weight of the wheels 81 being relatively greater than the combined weight of the wheel rails 80 and the extension members 88.

The trailer 10 also includes a trailer jack 94 (well known to those of ordinary skill) detachably and vertically secured to an offset coupler 106 via a cotter pin 98, the offset coupler 106 being integrally joined to an outer plate 96 of the corner support member 86. The outer plate 96 forms a "T" configuration with the inner plate 84, when taking a top view of the corner support member 86 of the trailer 10, thereby aligning a vertical axis of the trailer jack 94 with vertically disposed edges 100 of the inner plate 84, the diagonal line 36 and axis of the tow bar 16, when the tow bar is disposed in a horizontal position, resulting in maintained lineal alignment of the trailer 10 with a force vector generated by the tow vehicle upon the tow bar 16; the lineal alignment increasing stabilization of the trailer 10 when transporting a portable toilet upon undulating surfaces and/or in relatively strong winds.

Figure 2A:
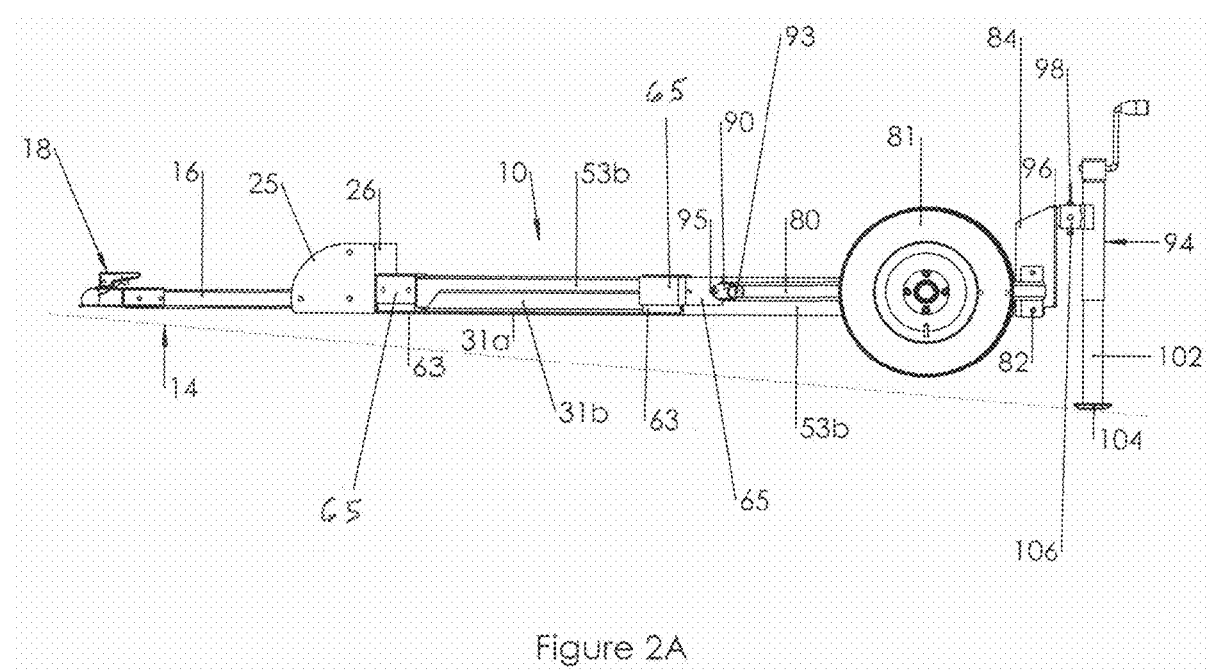
FIG. 2A is a side elevation view of the portable toilet trailer in FIG. 2, but with the portable toilet removed from the portable toilet trailer; the trailer coupler disposed upon the ground surface; and the extension portion of a trailer jack extended, whereby trailer wheels are elevated above the ground surface in accordance with the present invention.
Figure 2B:
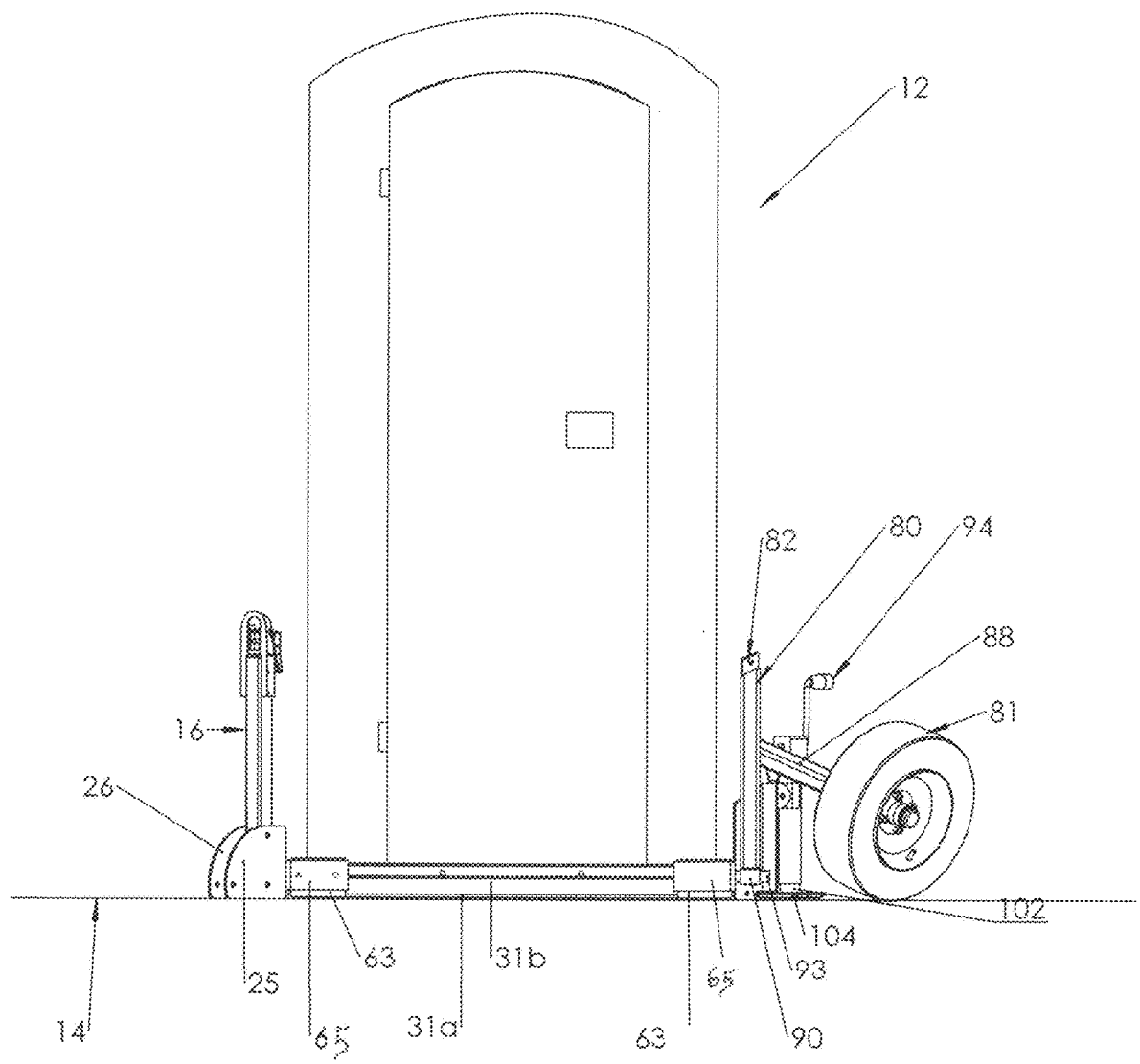
FIG. 2B is the door side elevation view of FIG. 2, but with the receiving frame disposed upon the ground surface; the tow bar disposed in a vertical position; and the trailer wheels disposed in an angular position upon the ground surface.
Figure 2C:
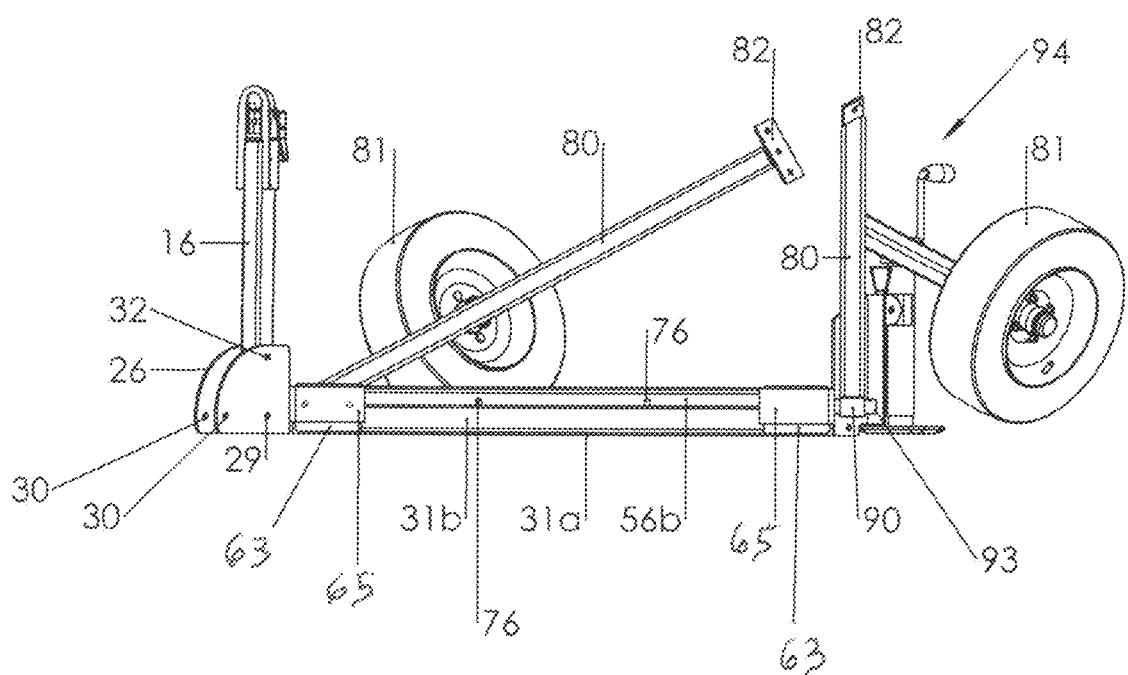
FIG. 2C is the door side elevation view of FIG. 2B, but with the portable toilet removed from the trailer.

An extension portion 102 of the trailer jack 94 can be extended until a base portion 104 attached to the bottom end of the extension portion 102 engages the ground surface 14 after the tow bar 16 is disconnected from the tow vehicle hitch manually or by a second trailer jack (not depicted) secured to the tow bar 16 (see FIGS. 2A and 2A1); whereupon, the coupler 18 of the tow bar 16 is disposed upon a selected surface area and the first ends 82 of the wheel rails 80 are disconnected from the inner plate 84 of the corner support member 86, thereby enabling the first ends 82 of the wheel rails 80 to elevate above the receiving frame 24 as the receiving frame 24 is lowered via the extension portion 102 of said trailer jack 94 being retracted until the base portion 104 is elevated to a position that correspondingly disposes the receiving frame 24 upon the ground surface 14 and the trailer wheels 81 angularly disposed upon the ground surface 14.

In operation, an elevation adjustable portable toilet trailer 10 is disposed proximate to a portable toilet 12, whereby the coupler 18 engages the ground surface 14, the wheel rails 80 are secured to the inner plate 84 of the corner support member 86, the trailer wheels 81 are perpendicularly engaging the ground surface 14 and supporting the receiving frame 24 above the ground surface, the extension members 88 are parallel to the ground surface 14, and the base portion 104 of the trailer jack 94 elevated above the ground surface 14.

The trailer jack 94 is then manually operated until the extension portion 102 positions the base portion 104 of the jack 94 upon a ground surface 14, thereby enabling the jack 94 to maintain the position of the receiving frame 24 above the ground surface 14 instead of the trailer wheels 81. The fasteners 92 are then removed from the inner plate 84 of the corner support member 86, thereby allowing the first ends 82 of the wheel rails 80 to be detached from the inner plate 84 and rise above the receiving frame 24 as the extension potion 102 is retracted and the receiving frame 24 is correspondingly lowered, resulting in the first ends 82 of the wheel rails 80 pivoting upwards and the trailer wheels 81 correspondingly angularly disposed upon the ground surface 14, whereby the extension members 88 form acute angles with the wheel rails 80 and the ground surface 14 due to the trailer wheels 81 being relatively heavier than the combined weight of the wheel rail 80 and the extension member 88, and that a surface portion of the trailer wheels 81 ordinarily do not congruently engage the ground surface 14.

The portable toiler 12 is then disposed upon the receiving frame 24 by elevating a back base portion 46 of the portable toilet 12 over a vertical portion 31b of the front bar 31 of the receiving frame 24, then sliding bottom side portions 59 of the base portion 71 of the portable toilet 12 upon the horizontal portions 53a of the side bar members 53 until the back base portion 46 engages a vertical portion 57b of the back angle bar 57 of the receiving frame 24. The base portion 71 is then slid forward until the front base portion 43 of the portable toilet 12 can be snugly slid forward until top walls 70 of toe members 67 of the base portion 71 snugly engage the upper inner walls 62 of horizontal extension portions 64 of the receiving channels 63, and the toe members 67 engage inner vertical walls of the channel members 63, thereby preventing vertical movement of the front base portion 43 of the portable toilet 12 upon the receiving frame 24.

The base portion 71 is then slid slightly backwards until the back base portion 46 is proximate to the vertical portion 57b of the receiving frame 24. The back base portion 46 is then detachably secured to the vertical portion 57b of the back angle bar member 57 via an angled locking bar 56 having a vertical portion 56b that is vertically and snugly inserted in a relatively small gap between vertical portions 57b and 56b; whereupon, vertical portion 56b is detachably secured to the vertical portion 57b via bolts 72 inserted through vertical slots 74 in the vertical portion 57b and extending through vertical slots 76 in the vertical portion 56b of the locking bar 56. The locking bar 56 includes a horizontal portion 56a that ultimately engages a top horizontal back edge portion 55 of the skid portion 71 of the portable toilet 12, whereby the vertical slots 74 and 76 cooperate to vertically and adjustably position the locking bar 56 to engage and maintain the horizontal portion 56a upon the top horizontal back edge portion 55 via nuts 78 rotationally secured to the bolts 72, until the nuts 78 engage an inner vertical side wall 79 of the vertical portion 56b, thereby securing the back base portion 46 upon the receiving frame 24.

Upon securing the portable toilet to the receiving frame 24, the extension portion 102 is then extended to position the base portion 104 on the ground surface 14 and ultimately elevated the receiver frame 24 to an elevation that promotes the manual reattachment of the wheel rails 80 to the inner plate 84, followed by the trailer jack 94 being manually operated to retract the extension portion 102 until the trailer wheels 81 support the receiver frame 24 and the attached portable toilet 12. A tow vehicle with a trailer hitch is cooperatively positioned adjacent to the trailer 10, whereby the trailer coupler 18 can be secured to the trailer hitch and the trailer 10 and attached portable toilet 12 transported to a destination for use where the receiving frame is again disposed on a ground surface 12 with portable toilet 12 remaining attached to the trailer 10 or separated from the trailer 10 to prevent the theft of the trailer 10. When the portable toilet 12 is no longer required, the receiving frame 24 disposed upon the ground surface 14 and the portable toilet 12 attached to (or having been reattached to) the receiving member 24, has the first ends 82 of wheel rails 80 reattached to the inner plate 84 via the jack 94 elevating the receiving frame 24; whereupon, the coupler 18 of the tow bar 16 is attached to the hitch of the tow vehicle, the extension portion 102 of the jack 94 is retracted and the trailer and attached portable toilet 12 is transported to the next destination.

The foregoing description is for purpose of illustration only and is not intended to limit the scope of protection accorded this invention. The scope of protection is to be measured by the following claims, which should be interpreted as broadly as the inventive contribution permits.

The invention claimed is:

1. An elevation adjustable portable toilet trailer for transporting a portable toilet comprising:
   a receiving frame for detachably securing a portable toilet to an elevation adjustable portable toilet trailer;
   a tow bar pivotally secured to a front corner of said receiving frame;
   at least two wheels rails having first ends detachably secured to a corner support member secured to a cooperating back corner of said receiving frame, said wheel rails having second ends pivotally secured to corresponding angled front and back corner members;
   at least one trailer wheel secured to each wheel rail;
   front channels secured to respective front corner members secured to front angle bar members of said receiving frame, each said front channels slidably receiving a cooperating toe member of a base portion of the portable toilet;
   a locking member detachably secured to a back angle bar member of said receiving frame, said locking member ultimately engaging a top back portion of the base portion of the portable toilet, said locking member cooperating with said front channels to detachably secure the portable toilet to said receiving frame; and
   a trailer jack secured to a back corner of said receiving frame, said trailer jack ultimately elevating and lowering said receiving frame to selected elevations; whereby, said receiving frame is lowered to detachably secure the portable toilet to said elevation adjustable portable toilet trailer, said receiving frame is elevated with the attached portable toilet to enable said elevation adjustable portable toilet trailer to transport the portable toilet to a destination, said receiving frame is lowered with the attached portable toilet upon a ground surface to enable a user to step into said portable toilet, and said receiving frame is elevated with the attached portable toilet to enable said elevation adjustable portable toilet trailer to transport the portable toilet when said elevation adjustable portable toilet trailer is towed to another destination.

2. The elevation adjustable portable toilet trailer of claim 1 wherein said receiving frame includes a substantially square configuration; whereby, a tow bar axis, a front corner outer edge and two vertically disposed edges of an inner plate of said corer support member are aligned with a diagonal line of said receiving frame.

3. The elevation adjustable portable toilet trailer of claim 2 wherein said receiving frame configuration positions the portable toilet, whereby air flow generated via a tow vehicle pulling said elevation adjustable portable toilet trailer, engages a front corner of the portable toilet, the air flow continuing laminarly across an angled planar door side and across an angled planar second side of the portable toilet relative to the linear position of the tow bar, thereby reducing wind resistance when compared to a portable toilet orientated, whereby the door side is perpendicularly disposed relative to the linear position of said tow bar.

4. The elevation adjustable portable toilet trailer of claim 1 wherein said receiving frame includes side angle bar members having horizontal and vertical portions that are integrally joined to cooperating horizontal and vertical portions of front and back angle bar members, thereby providing a support base via said receiving frame for outer bottom horizontal edge portions of a base portion of the portable toilet when the portable toilet is disposed upon said horizontal portions of respective side, front and back angle bar members.

5. The elevation adjustable portable toilet trailer of claim 4 wherein said integrally joined vertical portions of said front, side and back angle bar members provide a stabilizing base for maintaining the position of the portable toilet upon said horizontal members.

6. The elevation adjustable portable toilet trailer of claim 1 wherein said tow bar includes a coupler for detachably securing an outer end of said tow bar to enable said elevation adjustable portable toilet trailer to be towed, said tow bar having an inner end pivotally attached to said front corner of said receiving frame via an aligning plate and an outer plate parallel to said aligning plate and said aligning and outer plates integrally joined to said front corner of said receiving frame, whereby an inner edge of said aligning plate is integrally joined to an outer edge of said front corner, resulting in said aligning plate and said outer edge of said front corner aligning with a diagonal line of said receiving frame, thereby positioning said aligning plate for enabling a user of said elevation adjustable portable toilet trailer to slide a portable toilet upon a front angle bar member of said receiving frame and avoid said aligning plate and ultimately dispose the portable toilet upon said receiving frame.

7. The elevation adjustable portable toilet trailer of claim 6 wherein said aligning and outer plates include aligned apertures that receive a locking bolt, whereby said tow bar can be pivoted and secured in substantially horizontal or vertical positions by the user.

8. The elevation adjustable portable toilet trailer of claim 1 wherein said wheel rails are detachably secured to said receiver frame, whereby cooperating first ends of each wheel rail are detachably secured to an inner plate of said corner support member via fasteners that engage both cooperating first ends of said wheel rails and said inner plate of said corner support member, said wheel rails being integrally joined to an extension member that is detachably secured to said at least one trailer wheel.

9. The elevation adjustable portable toilet trailer of claim 8 wherein said wheel rails include pivoting second ends opposite said corresponding first end, said second ends being cylindrically configured with an aperture that receives a pivot pin having an inner end welded to respective outer side walls of cooperating front and back corner members, said second ends being pivotally retained upon said pivot pins via cotter pins.

10. The elevation adjustable portable toilet trailer of claim 9 wherein said first end of said each wheel rail is allowed to pivot above said receiving frame after said first ends are separated from said inner plate of said corner support member, whereby said trailer wheels are simultaneously repositioned angularly on the ground surface and said receiving frame is disposed upon the ground surface.

11. The elevation adjustable portable toilet trailer of claim 1 wherein said front channels secured to respective front corners of a front angle bar member of said receiving frame, each said front channel slidably receiving a cooperating toe member of a base portion of the portable toilet; whereby the toe members slidably engage bottom walls of a horizontal extension portions integrally joined to vertical portions of said front channels as the base portion is slide forward upon horizontal portions of side angle bar members until the toe members engage a vertical portion the said front angle bar member.

12. The elevation adjustable portable toilet trailer of claim 1 wherein said locking member includes a vertical portion detachably secured to a vertical portion of said back angle bar member via bolts inserted through vertical slots in said vertical portion, said bolts extending through vertical slots in said vertical portion of said back angle bar member, said locking bar including a horizontal portion that ultimately engages a top horizontal back edge portion of the base portion of the portable toilet; whereby said vertical slots cooperate to vertically and adjustably position said locking bar to engage and maintain said horizontal portion of said locking bar member upon the top horizontal back edge portion via nuts rotationally secured to said bolts, until said nuts engage an inner vertical side wall of said vertical portion of said locking bar member, said nuts being manually rotated when said receiving frame is elevated above the ground surface a distance that enables a user's hand to reach under said receiving frame, said locking bar member cooperating with said front channels to maintain the position of the base portion of the portable toilet upon said receiving frame when transporting the portable toilet.

13. The elevation adjustable portable toilet trailer of claim 1 wherein said trailer jack is detachably and vertically secured to an outer plate of a back corner support member via a cotter pin, said outer plate forming a "T" configuration with the inner plate, thereby aligning a vertical axis of said trailer jack with a vertically disposed edge of said inner plate, said receiving frame diagonal line and said tow bar axis, when said tow bar is disposed in a horizontal position.

14. The elevation adjustable portable toilet trailer of claim 13 wherein said trailer jack includes an extension portion ultimately extended until a base portion attached to a bottom end of said extension portion engages the ground surface after a coupler of said tow bar is disconnected from a tow vehicle hitch; whereupon, said coupler is disposed upon a selected ground surface and said first ends of said at least two wheel rails disconnected from said inner plate of said corner support member, thereby enabling first ends of said at least two wheel rails to elevate above said receiving frame as said receiving frame is lowered via said extension portion of said trailer jack being retracted until said base portion is elevated to a position that correspondingly disposes said receiving frame upon the ground surface.

15. The elevation adjustable portable toilet trailer of claim 1 wherein said receiving frame detachably receives the portable toilet via elevating a back base portion of the portable toilet over a vertical portion of said front bar angle bar member of said receiving frame, and sliding side portions of the base portion of the portable toilet upon horizontal portions of side bar members until the back base portion of the toilet engages a vertical portion of a back angle bar member of said receiving frame; whereupon, the base portion of the portable toilet is slid forward until top walls of toe members of the base portion snugly engage upper inner walls of horizontal extension portions of said receiving channels, and the toe members engage inner vertical walls of said channel members, thereby preventing vertical and forward motion of the front base portion of the portable toilet upon said receiving frame.

16. The elevation adjustable portable toilet trailer of claim 15 wherein said receiving frame detachably receives the portable toilet via slightly sliding the base portion of the portable toilet backwards until the back base portion is proximate to said vertical portion of said back angle bar member of said receiving frame; whereupon, the back base portion of the portable toilet is detachably secured to said vertical portion of said back angle bar member via an angled locking bar having a vertical portion vertically and snugly inserted in a gap between a vertical portion of the back base portion of the portable toilet and said vertical portion of said back angle bar member, whereby, said vertical portion of said locking bar member is detachably secured to said vertical portion of said back angle bar member and a horizontal portion of said locking bar member forcibly engages a top edge portion of the back base portion of the portable toilet, thereby securing the back base portion of the portable toilet upon a horizontal portion of said back angle bar member and preventing backward motion of the back base portion of the portable toilet upon said horizontal portion of said back angle bar member.

17. A portable toilet trailer comprising:
a receiving frame for detachably securing a portable toilet to a portable toilet trailer, said receiving frame having bar members with horizontal and vertical portions;
a tow bar secured to a front corner of said receiving frame;
two wheels rails having first ends detachably secured to a plate secured to a cooperating back corner of said receiving frame, said wheel rails having second ends pivotally secured to corresponding front and back corner members of said receiving frame;
a trailer wheel secured to each wheel rail;
front channels secured to respective front corner members of said receiving frame, each said front channels slidably receiving a cooperating toe member of a base portion of the portable toilet;
a locking member detachably secured to a back angle bar member of said receiving frame, said locking member ultimately engaging a top back portion of the base portion of the portable toilet, said locking member cooperating with said front channels to detachably secure the portable toilet to said receiving frame; and
a trailer jack secured to a back corner of said receiving frame, said trailer jack ultimately elevating and lowering said receiving frame to selected elevations; whereby, said receiving frame is lowered to detachably secure the portable toilet to said elevation adjustable portable toilet trailer, said receiving frame is elevated with the attached portable toilet to enable said elevation adjustable portable toilet trailer to transport the portable toilet to a destination, said receiving frame is lowered with the attached portable toilet upon a ground surface to enable a user to step into said portable toilet, and said receiving frame is elevated with the attached portable toilet to enable said elevation adjustable portable toilet trailer to transport the portable toilet when said elevation adjustable portable toilet trailer is towed to another destination.

18. The portable toilet trailer of claim 17 wherein said receiving frame configuration positions the portable toilet, whereby air flow generated via a tow vehicle pulling said elevation adjustable portable toilet trailer, engages a front corner of the portable toilet, the air flow continuing laminarly across an angled planar door side and across an angled planar second side of the portable toilet relative to the linear position of the tow bar, thereby reducing wind resistance when compared to a portable toilet orientated, whereby the door side is perpendicularly disposed relative to the linear position of said tow bar.

19. The elevation adjustable portable toilet trailer of claim 17 wherein said wheel rails are detachably secured to said receiving frame, whereby cooperating first ends of each wheel rail are detachably secured to said plate via fasteners that engage both cooperating first ends of said wheel rails and said inner plate, said wheel rails being integrally joined to an extension member that is detachably secured to said trailer wheel; said wheel rails having pivoting second ends opposite said corresponding first ends, said second ends being cylindrically configured with an aperture that receives a pivot pin having an inner end welded to respective outer side walls of cooperating front and back receiving frame corners, said second ends being pivotally retained upon said pivot pins via cotter pins.

20. An elevation adjustable portable toilet trailer comprising:

a receiving frame for detachably securing a portable toilet to an elevation adjustable portable toilet trailer;

a tow bar secured to a front corner of said receiving frame;

two wheels rails having first ends detachably secured to a plate secured to a cooperating back corner of said receiving frame, said wheel rails having second ends pivotally secured to corresponding front and back corners of said receiving frame;

a trailer wheel secured to each wheel rail;

front channels secured to respective front corner members of said receiving frame, each front channel receiving a cooperating base portion of the portable toilet;

a locking member detachably secured to said receiving frame, said locking member ultimately engaging a top portion of the base portion of the portable toilet, said locking member cooperating with said front channels to detachably secure the portable toilet to said receiving frame; and a trailer jack secured to a back corner of said receiving frame, said trailer jack ultimately elevating and lowering said receiving frame to selected elevations; whereby, said receiving frame is lowered to detachably secure the portable toilet to said elevation adjustable portable toilet trailer, said receiving frame is elevated with the attached portable toilet to enable said elevation adjustable portable toilet trailer to transport the portable toilet to a destination, said receiving frame is lowered with the attached portable toilet upon a ground surface to enable a user to step into said portable toilet, and said receiving frame is elevated with the attached portable toilet to enable said elevation adjustable portable toilet trailer to transport the portable toilet when said elevation adjustable portable toilet trailer is towed to another destination.

* * * * *